(12) United States Patent
Miyanishi et al.

(10) Patent No.: US 10,759,093 B2
(45) Date of Patent: Sep. 1, 2020

(54) TRANSMISSION BELT MANUFACTURING METHOD

(71) Applicant: BANDO CHEMICAL INDUSTRIES, LTD., Chuo-ku, Kobe-shi (JP)

(72) Inventors: Masaki Miyanishi, Kobe (JP); Naohisa Harushige, Kobe (JP); Yohei Hattori, Kobe (JP); Takashi Matsuoka, Kobe (JP); Yusaku Taoshita, Kobe (JP); Hisashi Izumi, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 16/147,645

(22) Filed: Sep. 29, 2018

(65) Prior Publication Data

US 2019/0030761 A1    Jan. 31, 2019

Related U.S. Application Data

(63) Continuation of application No. PCT/JP2017/007285, filed on Feb. 27, 2017.

(30) Foreign Application Priority Data

Mar. 30, 2016  (JP) ................................. 2016-069297

(51) Int. Cl.
*B29C 35/02*    (2006.01)
*B29D 29/10*    (2006.01)
(Continued)

(52) U.S. Cl.
CPC .............. *B29C 35/02* (2013.01); *B29D 29/10* (2013.01); *B29D 29/103* (2013.01); *F16G 5/08* (2013.01);
(Continued)

(58) Field of Classification Search
CPC .......... B29D 29/10; B29D 29/103; F16G 5/06; F16G 5/08; B29C 45/2681; B29C 39/08;
(Continued)

(56) References Cited

U.S. PATENT DOCUMENTS 3,964,846 A * 6/1976 Bliss ...................... B29D 29/00
425/28.1
4,184,822 A * 1/1980 Schwabauer .......... B29D 29/08
249/65
(Continued)

FOREIGN PATENT DOCUMENTS

JP        S6122926 B2 *  6/1986 ............. B29C 53/56
JP       2002-340102 A   11/2002
(Continued)

OTHER PUBLICATIONS

JP-S6122926_MT (Year: 1986).*

*Primary Examiner* — Matthew J Daniels
*Assistant Examiner* — Yunju Kim
(74) *Attorney, Agent, or Firm* — Maschoff Brennan

(57) ABSTRACT

According to a production method of a power transmission belt, a shaped structure having a cylindrical shape is placed radially inward of belt mold having a cylindrical shape. The shaped structure is provided on a mandrel and has a plurality of ridges arranged adjacent to one another in an axial direction of the shaped structure. The belt mold has a plurality of compression layer-shape grooves arranged adjacent to one another in an axial direction of the belt mold. The shaped structure is crosslinked by heating and pressing the shaped structure toward the mandrel while each of compression layer-forming portions, which are comprised of the plurality of ridges of the shaped structure, is fitted in an associated one of the compression layer-shape grooves of the belt mold, thereby molding a cylindrical belt slab.

12 Claims, 38 Drawing Sheets

(51) Int. Cl.
  *B29C 37/00* (2006.01)
  *B29C 33/42* (2006.01)
  *F16G 5/08* (2006.01)
  *F16G 5/20* (2006.01)

(52) U.S. Cl.
  CPC ............ *F16G 5/20* (2013.01); *B29C 33/42* (2013.01); *B29C 37/0053* (2013.01)

(58) Field of Classification Search
  CPC ..... B29C 39/24; B29C 53/56; B29C 47/0042; B23P 23/00
  USPC ............ 156/138; 264/49; 29/33 S; 425/28
  See application file for complete search history.

(56) References Cited

U.S. PATENT DOCUMENTS 7,305,744 B2 * 12/2007 Hara .................. B29D 29/08
                                                   29/33 S
2014/0103562 A1 * 4/2014 Okubo ................ B29D 29/103
                                                   264/49

FOREIGN PATENT DOCUMENTS

| JP | 2004-347108 A | 12/2004 |
| JP | 2010-125725 A | 6/2010 |
| JP | 2011-031407 A | 2/2011 |

* cited by examiner

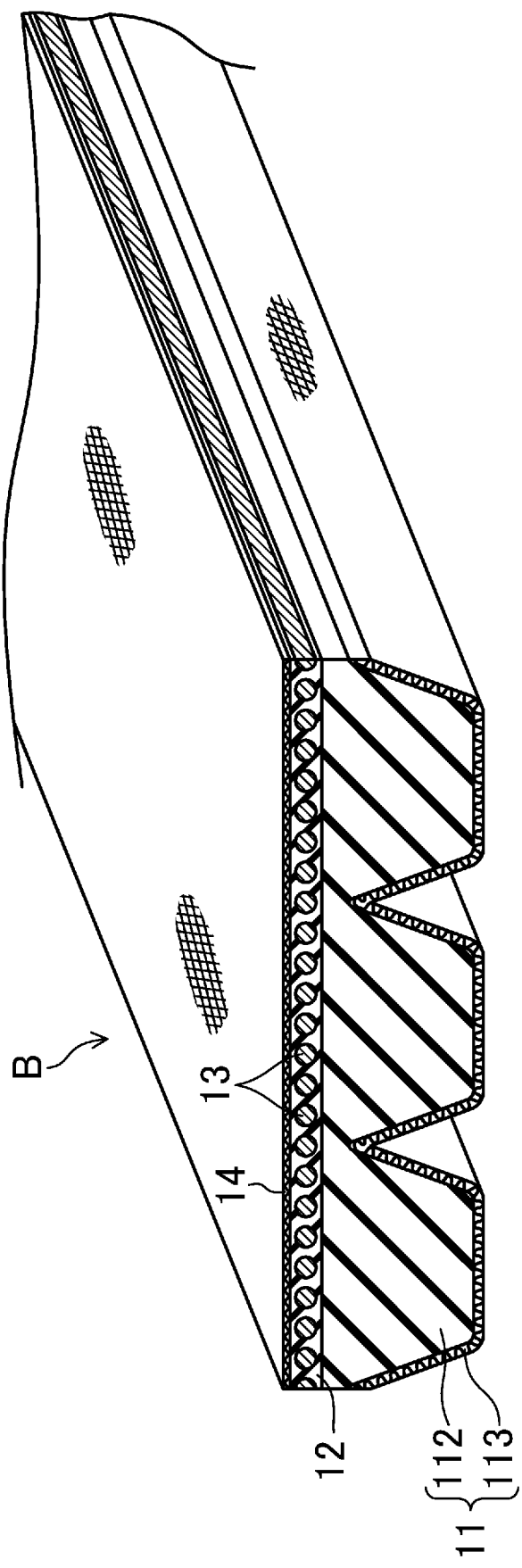

TRANSMISSION BELT MANUFACTURING METHOD

CROSS-REFERENCE TO RELATED APPLICATIONS

This is a continuation of International Application No. PCT/JP2017/007285 filed on Feb. 27, 2017, which claims priority to Japanese Patent Application No. 2016-069297 filed on Mar. 30, 2016. The entire disclosures of these applications are incorporated by reference herein.

BACKGROUND

The present invention relates to a method for producing a power transmission belt.

Raw edge V-belts are produced by cutting a strap body having a trapezoidal cross section from a cylindrical belt slab. In this technique, a large amount of waste rubber is generated from the belt slab because inclined surfaces of the raw edge V-belts on both sides in the width direction are formed by cutting. In order to reduce such waste rubber, Japanese Unexamined Patent Publication No. 2002-340102 discloses a technique in which, in cutting a V-belt from a belt slab, both edges of an outer peripheral portion of the belt are maintained at a right angle, and an inner peripheral portion of the belt is ground on both sides in the width direction to form inclined surfaces. Japanese Unexamined Patent Publication No. 2004-347108 discloses that the waste rubber generated at the time of producing a V-belt is recycled to be used for producing another V-belt. Further, a wrapped V-belt is produced on a one-on-one basis by covering, and shaping, the uncrosslinked belt body with the canvas, and crosslinking the uncrosslinked belt body (see, e.g., Japanese Unexamined Patent Publication No. 2011-031407 and Japanese Unexamined Patent Publication No. 2010-125725).

SUMMARY

The present invention is directed to a production method of a power transmission belt having a compression layer which forms an inner peripheral side, in a thickness direction, of the power transmission belt. The method includes: placing a shaped structure having a cylindrical shape at a location radially inward of a belt mold having a cylindrical shape, the shaped structure being provided on a mandrel and having, on an outer peripheral surface, a plurality of ridges extending in a circumferential direction and arranged adjacent to one another in an axial direction of the shaped structure, the belt mold being made of an elastomer and having, on an inner peripheral surface, a plurality of compression layer-shape grooves extending in a circumferential direction and arranged adjacent to one another in an axial direction of the belt mold; and crosslinking the shaped structure placed radially inward of the belt mold by heating and pressing the shaped structure toward the mandrel, while each of compression layer-forming portions to be the compression layer, the compression layer-forming portions being comprised of the plurality of ridges of the shaped structure, is fitted in an associated one of the compression layer-shape grooves of the belt mold, thereby molding a cylindrical belt slab.

BRIEF DESCRIPTION OF THE DRAWINGS

FIG. 25C illustrates a perspective view of a third V-ribbed belt according to another embodiment.

DETAILED DESCRIPTION

Embodiments will be described in detail below with reference to the drawings.

First Embodiment

Figure 1:
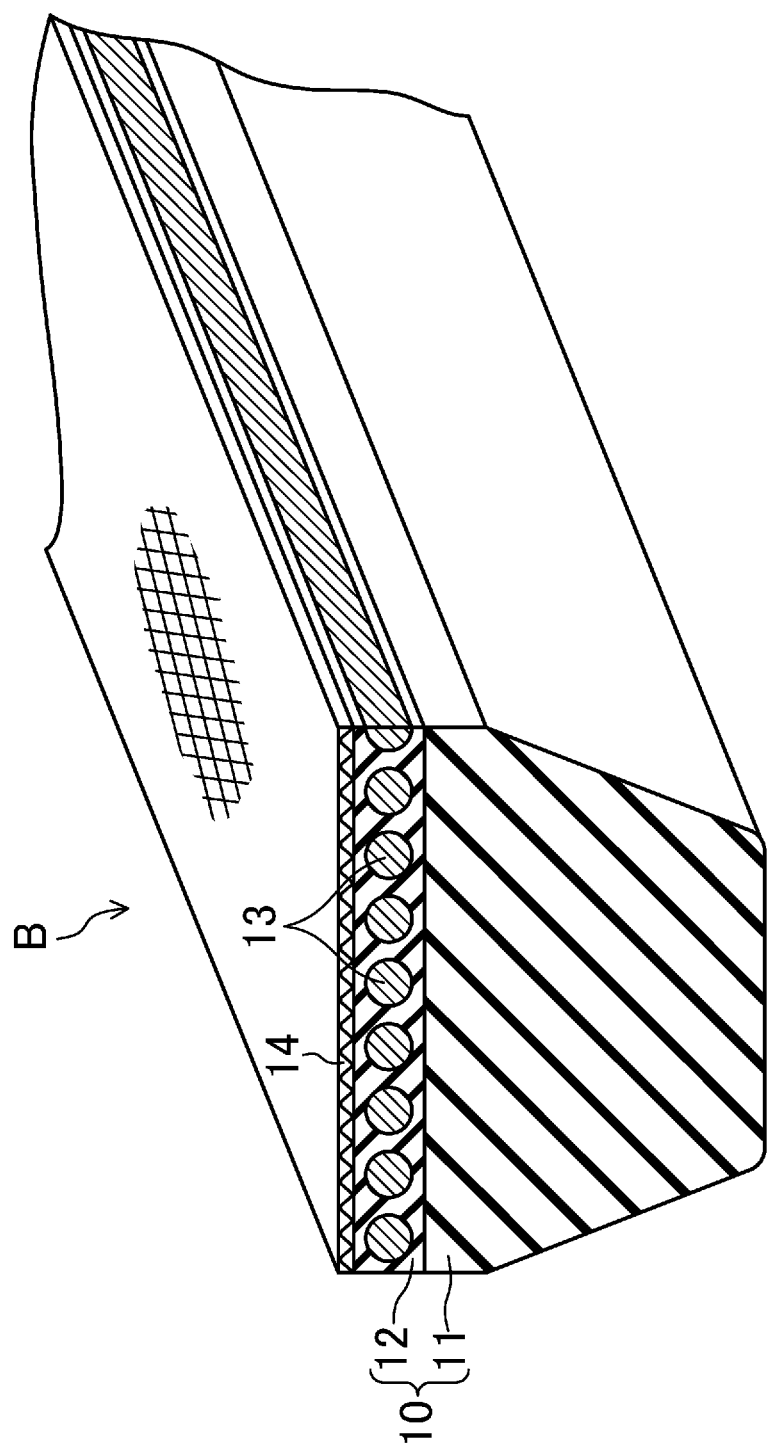
FIG. 1 illustrates a perspective view of a V-belt according to a first embodiment.

FIG. 1 illustrates a raw edge V-belt B (a power transmission belt) according to a first embodiment. The V-belt B is usable as a power transmission member for various machines. For example, the V-belt B has a length of 500 mm to 3000 mm, a width of 7.5 mm to 32 mm, and a thickness of 5.5 mm to 20 mm.

The V-belt B of the first embodiment is comprised of a rubber-made belt body 10 including a compression layer 11 which forms an inner peripheral side, in the thickness direction, of the belt B and a tensile layer 12 which forms an outer peripheral side, in the thickness direction, of the belt B. A cord 13 is embedded in a middle portion, in the thickness direction, of the tensile layer 12. The cord 13 forms, in the tensile layer 12, a helical pattern having pitches in the width direction. A reinforcing fabric 14 is attached to the outer side of the tensile layer 12, i.e., the back face of the belt. The V-belt B is configured such that the reinforcing fabric 14, the tensile layer 12, and an upper portion of the compression layer 11, which together constitute an outer side portion of the belt B, have the same width. This means that the side surfaces of that portion are perpendicular to the back face of the belt. The other portion of the belt B which constitutes an inner side portion of the belt B, i.e., a lower portion of the compression layer 11, is configured to have a smaller width toward the inner side. This means that the side surfaces, in the width direction, of that portion are inclined surfaces which are angled inward with respect to the back face of the belt toward the inner side. The inclined surfaces constitute a friction transmission surface. Note that the V-belt B may include a stretch rubber layer instead of the reinforcing fabric 14. Thus, the rubber-made belt body may include the compression layer, the tensile layer, and the stretch rubber layer.

The compression layer 11 and the tensile layer 12 are each made of a crosslinked rubber composition which is produced through heating and pressing of an uncrosslinked rubber composition prepared by kneading a blend of a rubber component and various compound ingredients. Thus, the compression layer 11 of the V-belt B of the first embodiment is comprised of a single rubber layer. The compression layer 11 and the tensile layer 12 may be made of the same rubber composition.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One kind or a blend of two or more kinds of these substances is suitable as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be added in the rubber composition making the compression layer 11 include surface texture modifiers such as short fibers, fluororesin powder, polyethylene resin powder, hollow particles, and a foaming agent.

The cord 13 is made of a twisted yarn of fibers, such as polyester fibers, polyethylene naphthalate fibers, aramid fibers, and vinylon fibers. The cord 13 has undergone an adhesion treatment to be adhesive to the tensile layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the tensile layer 12 of the belt body 10.

(First Production Method)

A first production method of the V-belt B according to the first embodiment will be described with reference to FIGS. 2 to 9.

The first production method includes a component preparation step, a shaping step, a crosslinking step, and a finishing step.

<Component Preparation Step>

In the component preparation step, a compressed rubber sheet 11' which is to constitute a compression layer 11, an tensile rubber sheet 12' which is to constitute a tensile layer 12, a cord 13', and a reinforcing fabric 14' are prepared.

—Compressed Rubber Sheet 11'—

A rubber component and compound ingredients are kneaded together by using a kneading machine such as a kneader or a Banbury mixer to obtain an uncrosslinked rubber composition. The uncrosslinked rubber composition is formed into a thick uncrosslinked rubber sheet 11'' by calender molding, etc. The compressed rubber sheet 11' is then prepared from the uncrosslinked rubber sheet 11''.

Figure 2:
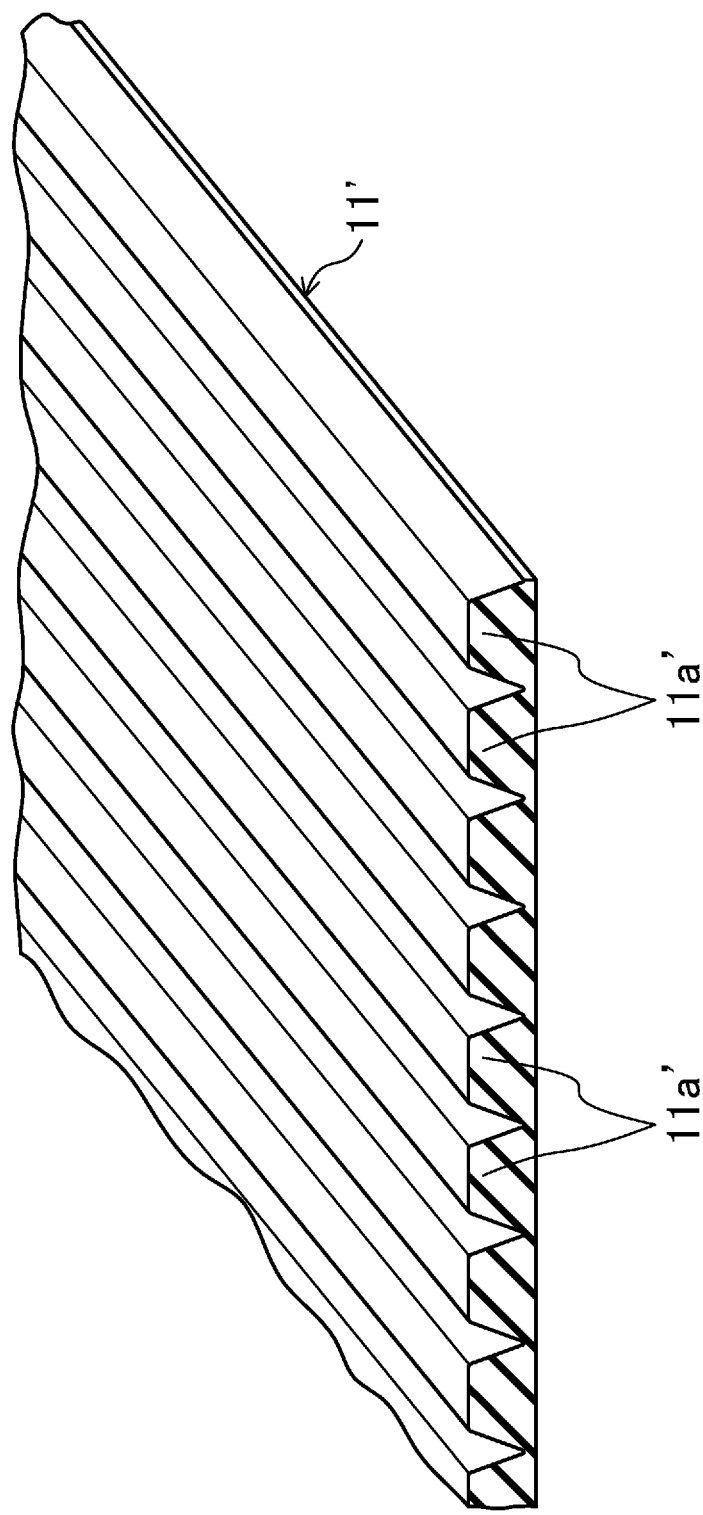
FIG. 2 illustrates a perspective view of a compressed rubber sheet for use in a first production method of the first embodiment.

FIG. 2 illustrates the compressed rubber sheet 11'.

The compressed rubber sheet 11' has, on one of the surfaces, a plurality of compression layer-forming portions 11a', which are linearly-extending ridges and extend parallel to one another. The compressed rubber sheet 11' is formed into a shape which looks like a collection of a plurality of compression layers 11 each forming part of a V-belt B to be produced, wherein the compression layers 11 are arranged side by side and connected together such that adjacent compression layers 11 are coupled to each other at the sides. This means that the plurality of compression layer-forming portions 11a' have the same shape. Each compression layer-forming portion 11a' has a width decreasing toward its distal end. Specifically, each compressed rubber layer-forming portion 11a' is shaped to have a cross section in an isosceles trapezoidal shape. The size of the compression layer-forming portion 11a' may be the same as, or somewhat larger than, the size of the compression layer 11 of the V-belt B to be produced.

Figure 3A:
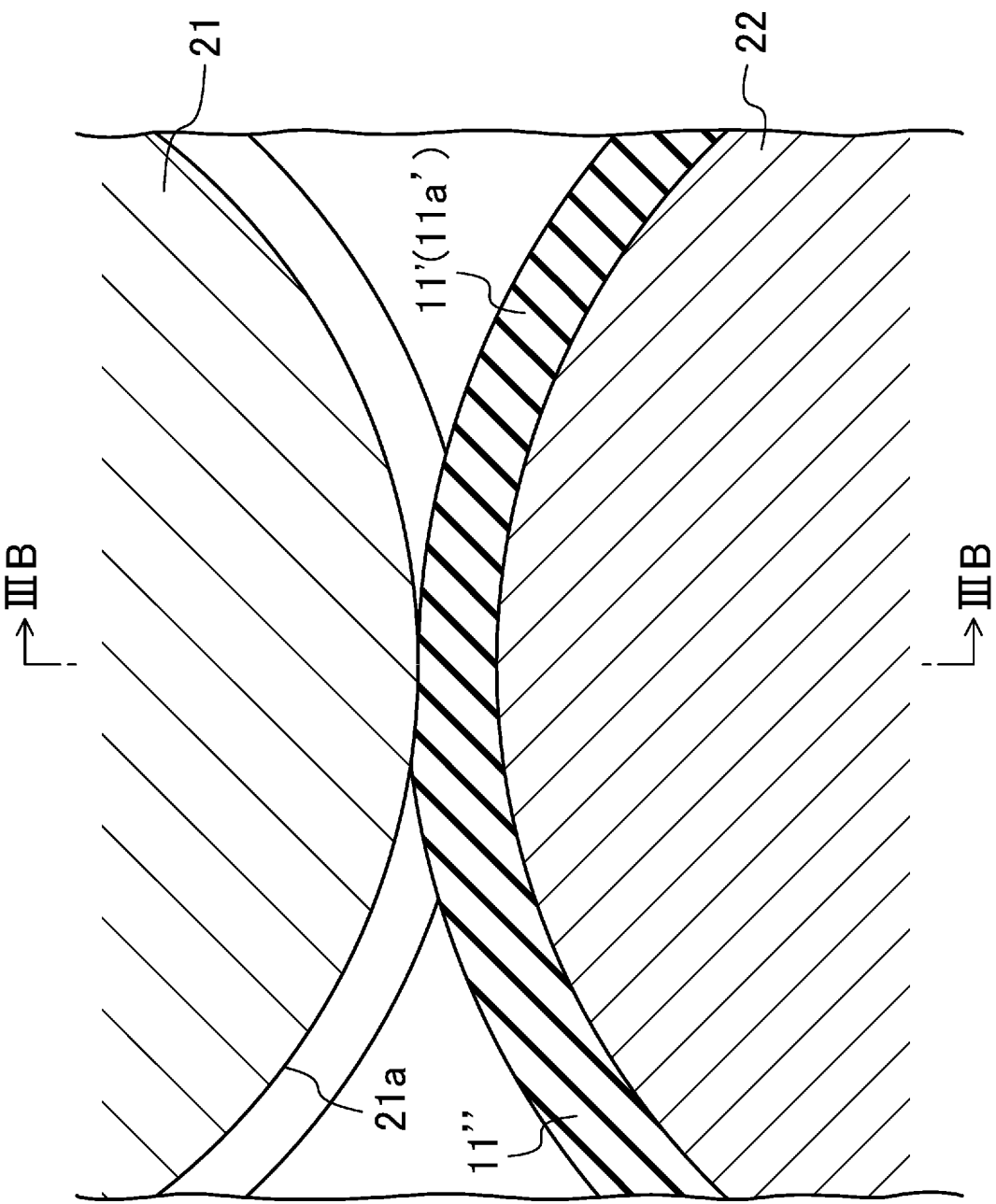
FIG. 3A is a diagram for showing how to prepare the compressed rubber sheet in a component preparation step in the first production method of the first embodiment.
Figure 3B:
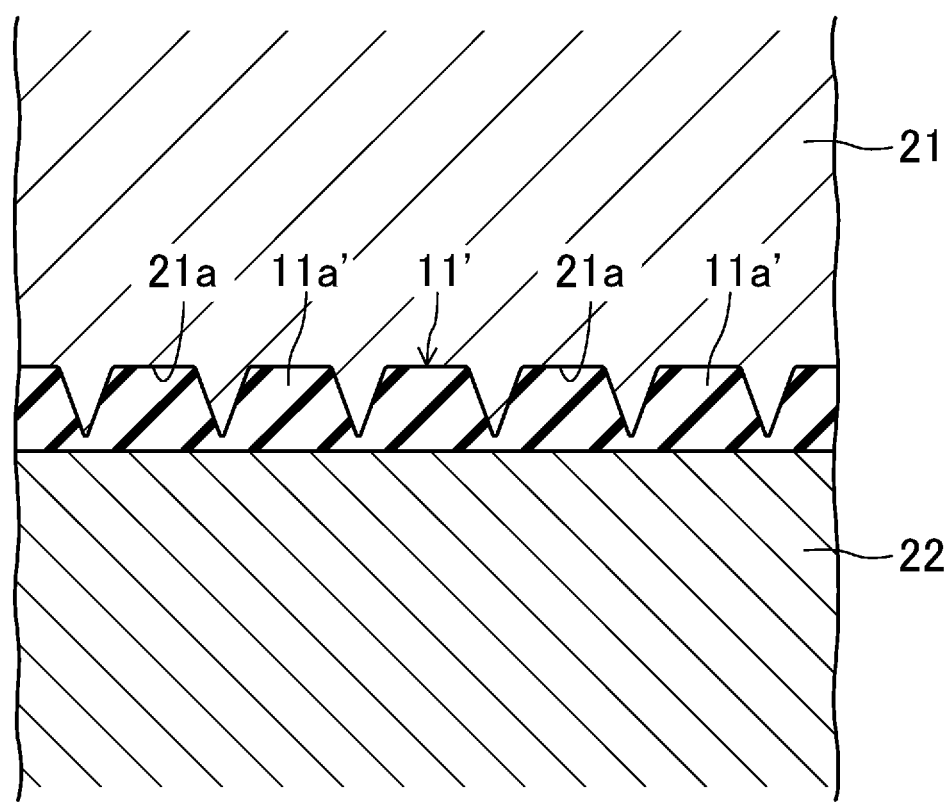
FIG. 3B is a cross-sectional view taken along line IIIB-IIIB of FIG. 3A.

The compressed rubber sheet 11' can be prepared in the following manner. As shown in FIGS. 3A and 3B, the uncrosslinked rubber sheet 11'' is passed between a flat roll 22 and a compressed rubber-shaping roll 21 having trapezoidal grooves 21a that have a shape corresponding to the shape of the compression layer-forming portions 11a' of the compressed rubber sheet 11', extend in the circumferential direction, and are arranged adjacent to each other in the axial direction of the compressed rubber-shaping roll 21. In this manner, the trapezoidal grooves 21a on the outer peripheral surface of the compressed rubber-shaping roll 21 are pressed onto one of the surfaces of the uncrosslinked rubber sheet 11'', thereby forming the compression layer-forming portions 11a'. The uncrosslinked rubber sheet 11'' may be heated to increase the plasticity of the uncrosslinked rubber sheet 11''. The compressed rubber sheet 11' can also be prepared by press molding or extrusion molding.

—Tensile Rubber Sheet 12'—

A rubber component and compound ingredients are kneaded together by using a kneading machine such as a kneader or a Banbury mixer to obtain an uncrosslinked rubber composition. The uncrosslinked rubber composition is molded by calender molding or the like, into a sheet, i.e., the tensile rubber sheet 12'.

—Cord 13'—

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

—Reinforcing Fabric 14'—

A woven fabric or a fabric of any other type which is to constitute a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric to face the belt body 10 and dried. The fabric may undergo, prior to these adhesion treatments, a base treatment in which the fabric is soaked in an epoxy resin solution or an isocyanate resin solution and heated. In the case where a stretch rubber layer is provided instead of the reinforcing fabric 14, a stretch rubber sheet to constitute the stretch rubber layer is prepared in a similar manner to the tensile rubber sheet 12'.

<Shaping Step>

Figure 4A:
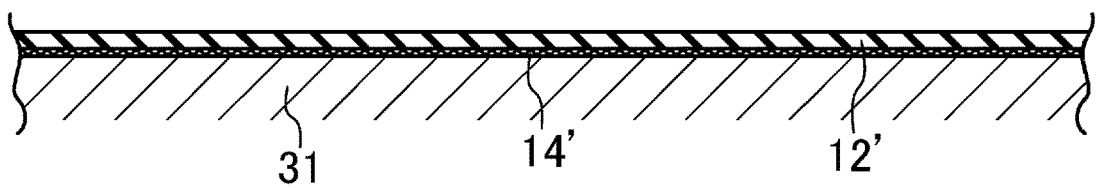
FIG. 4A is a first diagram for showing a shaping step of the first production method of the first embodiment.

In the shaping step, first, a mandrel 31 having a cylindrical shape and made of a rigid material, such as metal, is rotatably supported on a shaft of a shaping machine (not shown) such that the axis of the mandrel 31 extends horizontally. As shown in FIG. 4A, a reinforcing fabric 14' is wrapped around the mandrel 31, and then, the tensile rubber sheet 12' is wrapped around the reinforcing fabric 14'. The mandrel 31 is chosen so as to correspond to the length of the V-belt B to be produced. In this step, the tensile rubber sheet 12' is stacked on the reinforcing fabric 14'. Each of the reinforcing fabric 14' and the tensile rubber sheet 12' is cut with an ultrasound cutter, air scissors, or the like, and its ends are lap jointed together. Alternatively, a reinforcing fabric 14' having a predetermined length may be formed into a cylindrical shape through joining of its both ends, and this cylindrical reinforcing fabric 14' may be fitted over the mandrel 31. Alternatively, a reinforcing fabric 14' and a tensile rubber sheet 12' may be stacked and integrated together into a layered structure, and then, this layered structure may be wrapped around the mandrel 31. Alternatively, the layered structure having a predetermined length may be formed into a cylindrical shape through joining of its both ends such that the tensile layer 12 faces outside, and the resultant cylindrical structure may be fitted over the mandrel 31. In the case of providing a stretch rubber layer, a stretch rubber sheet is used instead of the reinforcing fabric 14', and the shaping step is carried out in a similar manner.

Figure 4B:
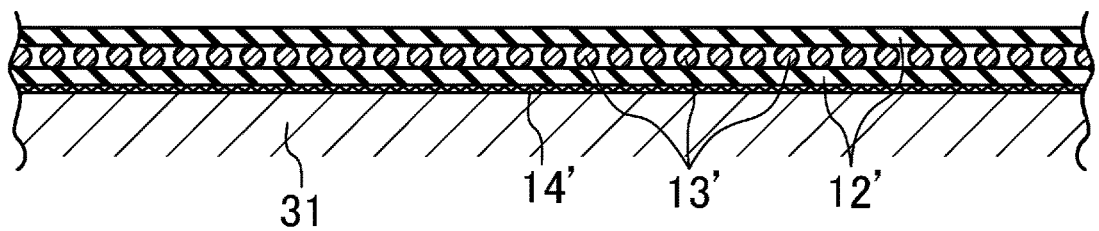
FIG. 4B is a second diagram for showing the shaping step of the first production method of the first embodiment.

Subsequently, as shown in FIG. 4B, a cord 13' is helically wound around the tensile rubber sheet 12'. Another tensile rubber sheet 12' is then wrapped over the wound cord 13'. Thus, a layer of the cord 13' is stacked on the tensile rubber sheet 12', and the other tensile rubber sheet 12' is stacked on the layer of the cord 13'. The tensile rubber sheet 12' is cut with an ultrasound cutter, air scissors, or the like, and its ends are lap jointed together.

Figure 4C:
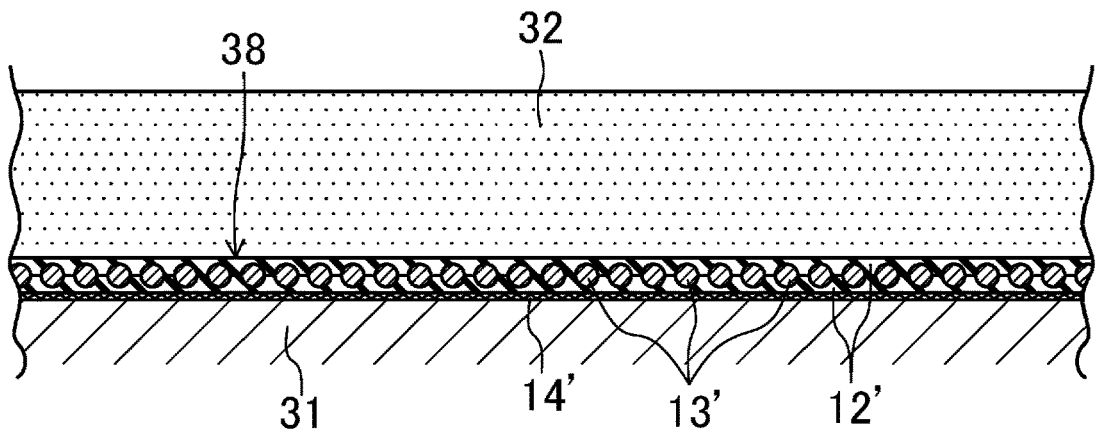
FIG. 4C is a third diagram for showing the shaping step of the first production method of the first embodiment.

Subsequently, as shown in FIG. 4C, the entire circumferential surface of the tensile rubber sheet 12' is pressed with a roller 32. At this moment, the rubber flows and enters between turns of the cord 13', and the cord 13' is embedded between the pair of tensile rubber sheets 12' so as to be fixed in position. As a result, these components are all integrated into a cylindrical tensile member 38. This operation may be carried out simultaneously with the wrapping of the tensile rubber sheet 12' around the layer of the cord 13'.

Figure 4D:
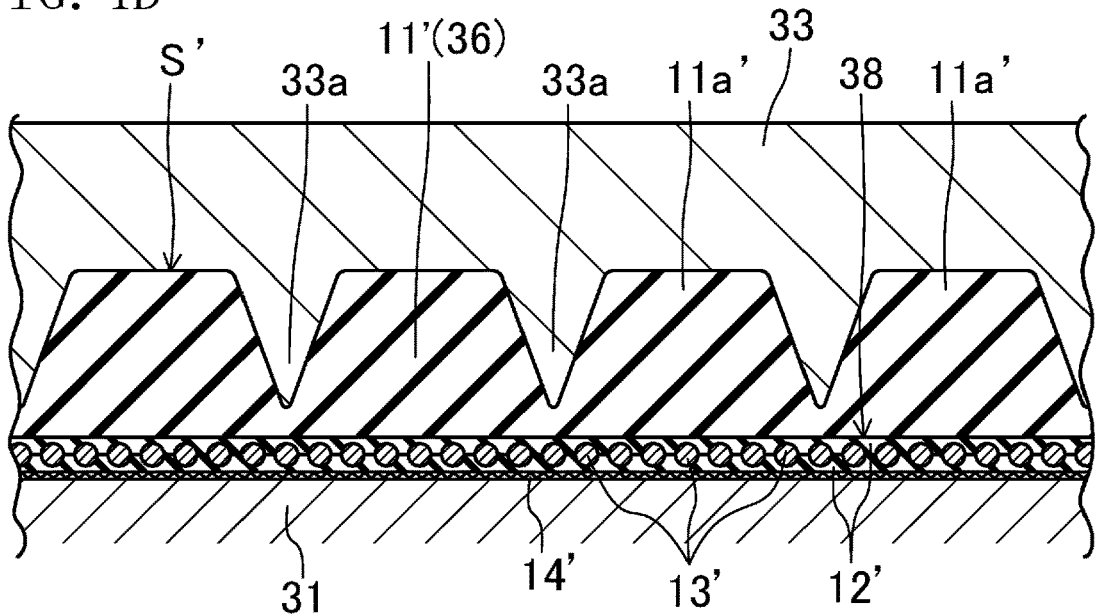
FIG. 4D is a fourth diagram for showing the shaping step of the first production method of the first embodiment.

Next, as shown in FIG. 4D, the compressed rubber sheet 11' is wrapped around the tensile rubber sheet 12' of the tensile member 38 such that the compression layer-forming portions 11a' face outside and extend in the circumferential direction. At this moment, a comb-shaped guide 33 having a shape corresponding to the compression layer-forming portions 11a' of the compressed rubber sheet 11' is set outside the mandrel 31 such that the guide 33 extends in the axial direction and such that comb teeth 33a of the guide 33 face the mandrel 31. Each of the compression layer-forming portions 11a' of the compressed rubber sheet 11' is guided between an associated pair of the comb teeth 33a, so that the compressed rubber sheet 11' is wrapped around, and stacked on, the tensile rubber sheet 12', with the compression layer-forming portions 11a' extending in the circumferential direction with high precision. The compressed rubber sheet 11' is cut with an ultrasound cutter or the like, and its ends are butt jointed. To increase the joint strength, the butt joint is suitably achieved by abutting surfaces, of the compressed rubber sheet 11', which are oblique with respect to the thickness direction of the compressed rubber sheet 11'. A compressed rubber sheet 11' having a predetermined length may be formed into a cylindrical shape with its both ends joined together such that the compression layer-forming portions 11a' face outside, and this cylindrical compressed rubber sheet 11' may be fitted over the tensile rubber sheet 12'.

In the manner described above, an uncrosslinked slab S' having a cylindrical shape is formed on the mandrel 31. The uncrosslinked slab S' includes the reinforcing fabric 14', the tensile rubber sheet 12', the cord 13', the other tensile rubber sheet 12', and the compressed rubber sheet 11' that are sequentially stacked toward the outside. The uncrosslinked slab S' includes the compressed rubber sheet 11' formed into a cylindrical shape, i.e., the shaped structure 36 which has a cylindrical shape. The shaped structure 36 is made of the uncrosslinked rubber composition and has, on its outer peripheral surface, the compression layer-forming portions 11a' which are the plurality of ridges extending in the circumferential direction and are arranged adjacent to one another in the axial direction. The number of the compression layer-forming portions 11a' included in the uncrosslinked slab S' is 20 to 100, for example.

<Crosslinking Step>

Figure 5A:
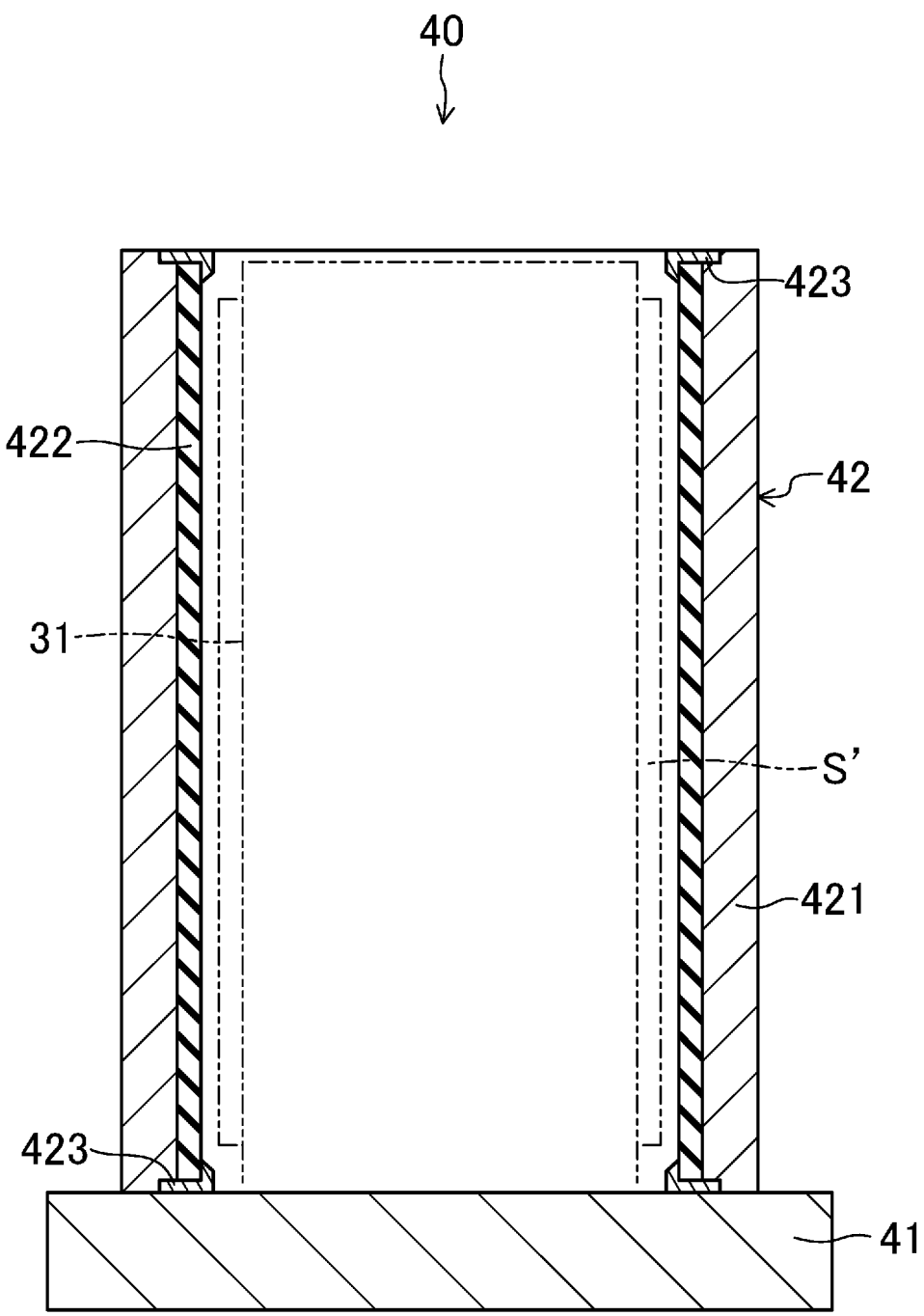
FIG. 5A illustrates a cross-sectional view of a crosslinking apparatus for use in the first production method of the first embodiment.
Figure 5B:
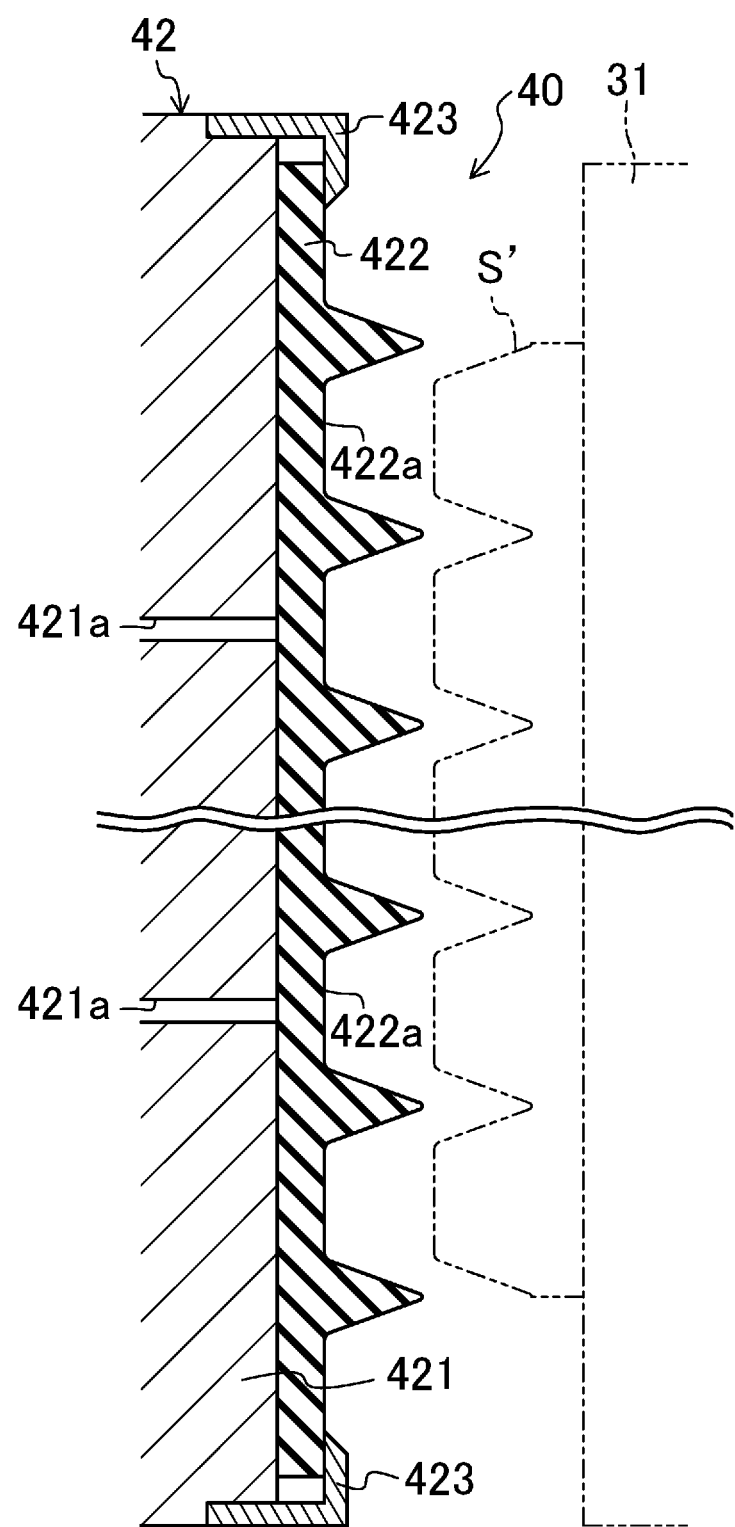
FIG. 5B illustrates, on an enlarged scale, a cross-sectional view of a portion of the crosslinking apparatus for use in the first production method of the first embodiment.

FIGS. 5A and 5B illustrate a crosslinking apparatus 40 for use in a crosslinking step.

The crosslinking apparatus 40 includes a base 41 and a columnar drum member 42 standing on the base 41.

The drum member 42 is attachable to, and detachable from, the base 41. The drum member 42 includes a cylindrical drum body 421 and a cylindrical expansion sleeve 422 (a belt mold) internally fitted to the inner periphery of the drum body 421. The expansion sleeve 422 is made of an elastomer, such as rubber and resin. The drum body 421 has, in its inner peripheral wall, a large number of air-passage holes 421a communicating with a pressurizing means (not shown). The expansion sleeve 422 has, on its inner peripheral surface, a plurality of compression layer-shape grooves 422a which extend in the circumferential direction and are arranged adjacent to one another in the axial direction of the expansion sleeve 422. Each compression layer-shape groove 422a has a width decreasing toward its groove bottom. Specifically, each compression layer-shape groove 422a has the same isosceles trapezoidal cross section as the compression layer 11 of the V-belt B to be produced. Both ends of the expansion sleeve 422 are fixed to the drum body 421 by fixing rings 423, and the expansion sleeve 422 and the drum body 421 are sealed at the both ends. The crosslinking apparatus 40 is configured such that the expansion sleeve 422 is inflated radially inward by high-pressure air introduced between the drum body 421 and the expansion sleeve 422 by the pressurizing means through the air-passage holes 421a. The crosslinking apparatus 40 is also configured such that the mandrel 31 can be placed radially inward of the drum member 42 and stand on the base 41 so as to be coaxial with the central axis of the apparatus. The crosslinking apparatus 40 is also provided with a heating means (not shown) for heating the mandrel 31.

Figure 6A:
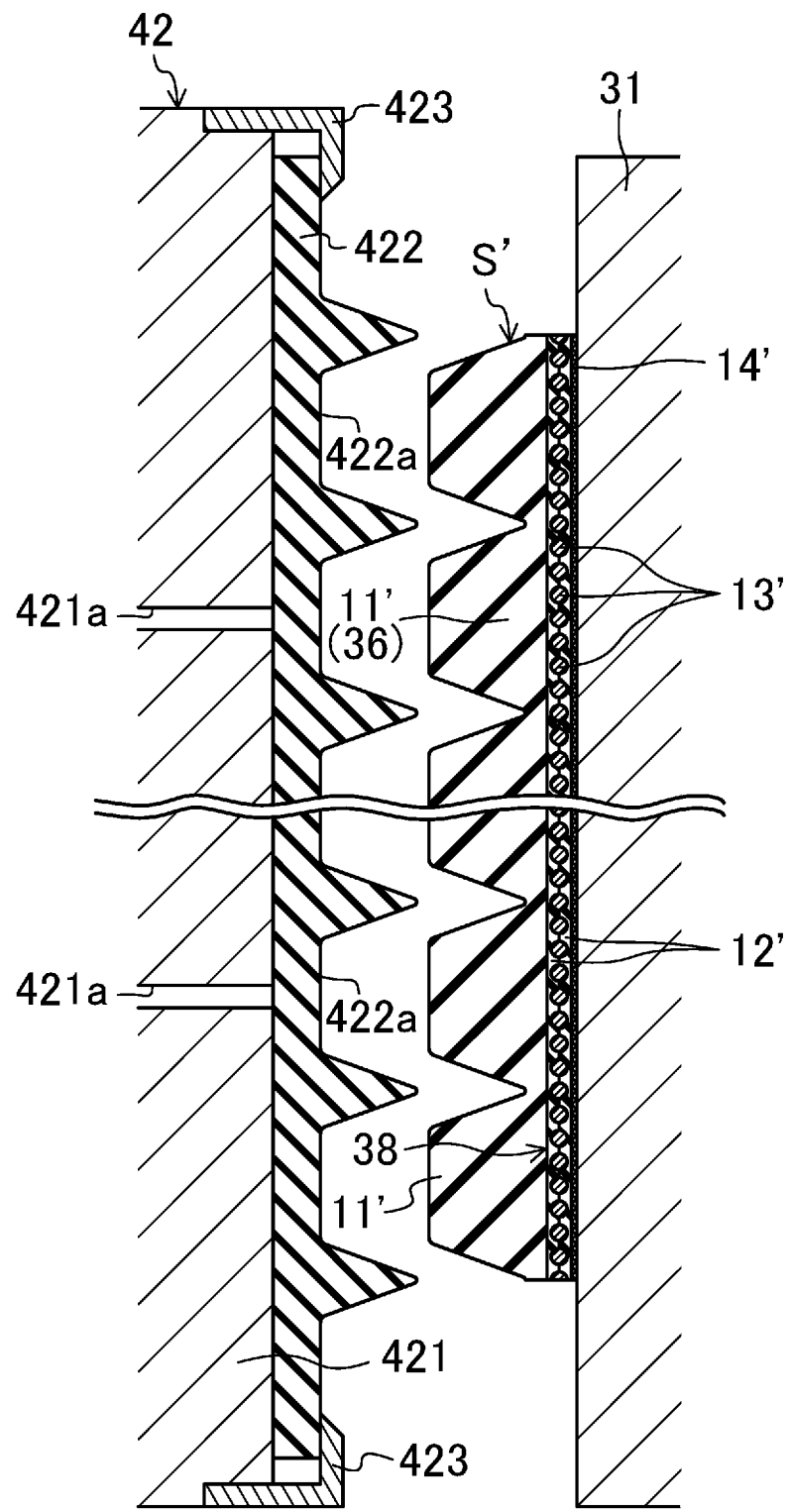
FIG. 6A is a first diagram for showing a crosslinking step of the first production method of the first embodiment.

In the crosslinking step, the mandrel 31, on which the uncrosslinked slab S' is formed, is placed radially inward of the drum member 42 so as to be coaxial with the central axis of the crosslinking apparatus 40. In placing the mandrel 31, as illustrated in FIG. 6A, the uncrosslinked slab S' including the shaped structure 36 having a cylindrical shape is placed radially inward of the expansion sleeve 422, and each compression layer-forming portion 11a' of the uncrosslinked slab S' is positioned at an opening of an associated one of the compression layer-shape grooves 422a of the expansion sleeve 422. It is suitable to select such a drum member 42 in which the inner diameter at the opening of the compression layer-shape groove 422a is slightly larger than the outer diameter of the uncrosslinked slab S' provided on the mandrel 31 in order to reduce looseness of the expansion sleeve 422 when expanded radially inward (which will be described later) and improve the precision of the molded shape. Note that short fibers, resin powder, or the like may be attached to the inner peripheral surface of the expansion sleeve 422 and/or the outer peripheral surface of the uncrosslinked slab S' in advance.

Figure 6B:
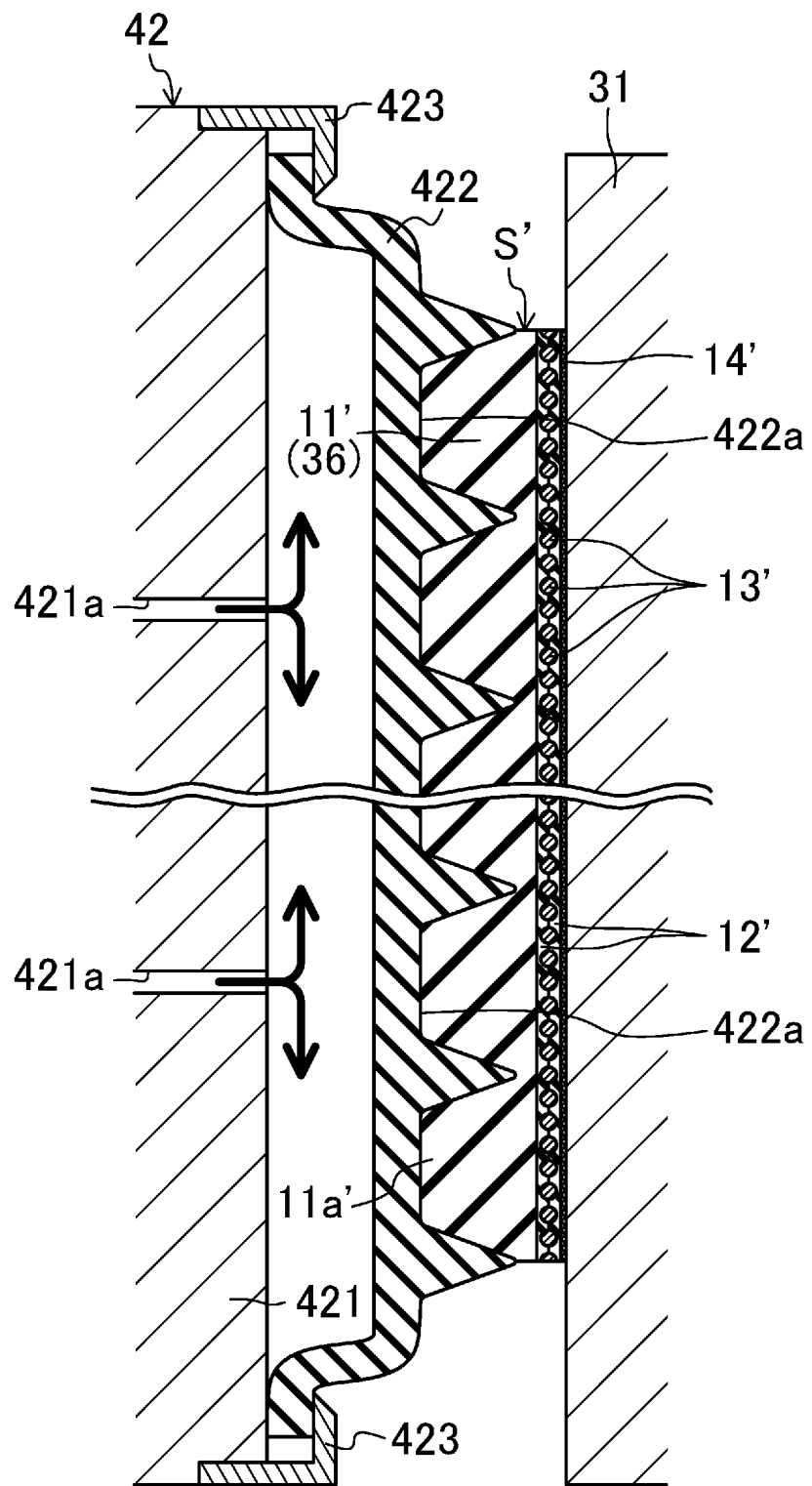
FIG. 6B is a second diagram for showing the crosslinking step of the first production method of the first embodiment.

As shown in FIG. 6B, the temperature of the mandrel 31 is increased by the heating means, and the pressurizing means introduces high-pressure air between the drum body 421 and the expansion sleeve 422 through the air-passage holes 421a so as to expand the expansion sleeve 422 radially inward. This state is maintained for a predetermined period of time. That is, the pressing of the shaped structure 36 toward the mandrel 31 is carried out by the expansion sleeve 422 expanding radially inward. At this moment, the uncrosslinked slab S' receives a compression force applied in a radially inward direction, causing each of the compression layer-forming portions 11a' to be fitted in an associated one of the compression layer-shape groove 422a of the expansion sleeve 422. While in this state, the uncrosslinked slab S' is heated and pressed against the mandrel 31 by the expansion sleeve 422. In addition, the rubber components contained in the compressed rubber sheet 11' and the tensile rubber sheets 12' that are included in the uncrosslinked slab S' are crosslinked and integrated with one another. As a result, a continuous structure of belt bodies 10 for a plurality of V-belts B, each including the compression layer 11 and the tensile layer 12, is produced. At the same time, the rubber components adhere to, and are combined with, the cord 13' and the reinforcing fabric 14'. A cylindrical belt slab S is thus formed eventually. The heating is carried out at a temperature of 100° C. to 180° C., for example. The pressurization is carried out at a pressure of 0.5 MPa to 2.0 MPa, for example. The process continues for 10 minutes to 60 minutes, for example.

After the lapse of the predetermined period of time, the pressure applied by the pressurizing means is released, causing the expansion sleeve 422 to come back to the normal position. The restraint on the mandrel 31, on which the belt slab S has been formed, is therefore removed.

Now, a crosslinking step using another crosslinking apparatus 40, shown in FIG. 7, having a different configuration will be described.

In this crosslinking apparatus 40 having a different configuration, the drum body 421 of the drum member 42 is provided with a hollow 424 at a backside position of the expansion sleeve 422. The drum body 421 has, in its inner peripheral wall, a large number of air-passage holes 421a each communicating with a pressurizing/depressurizing means (not shown).

Figure 8A:
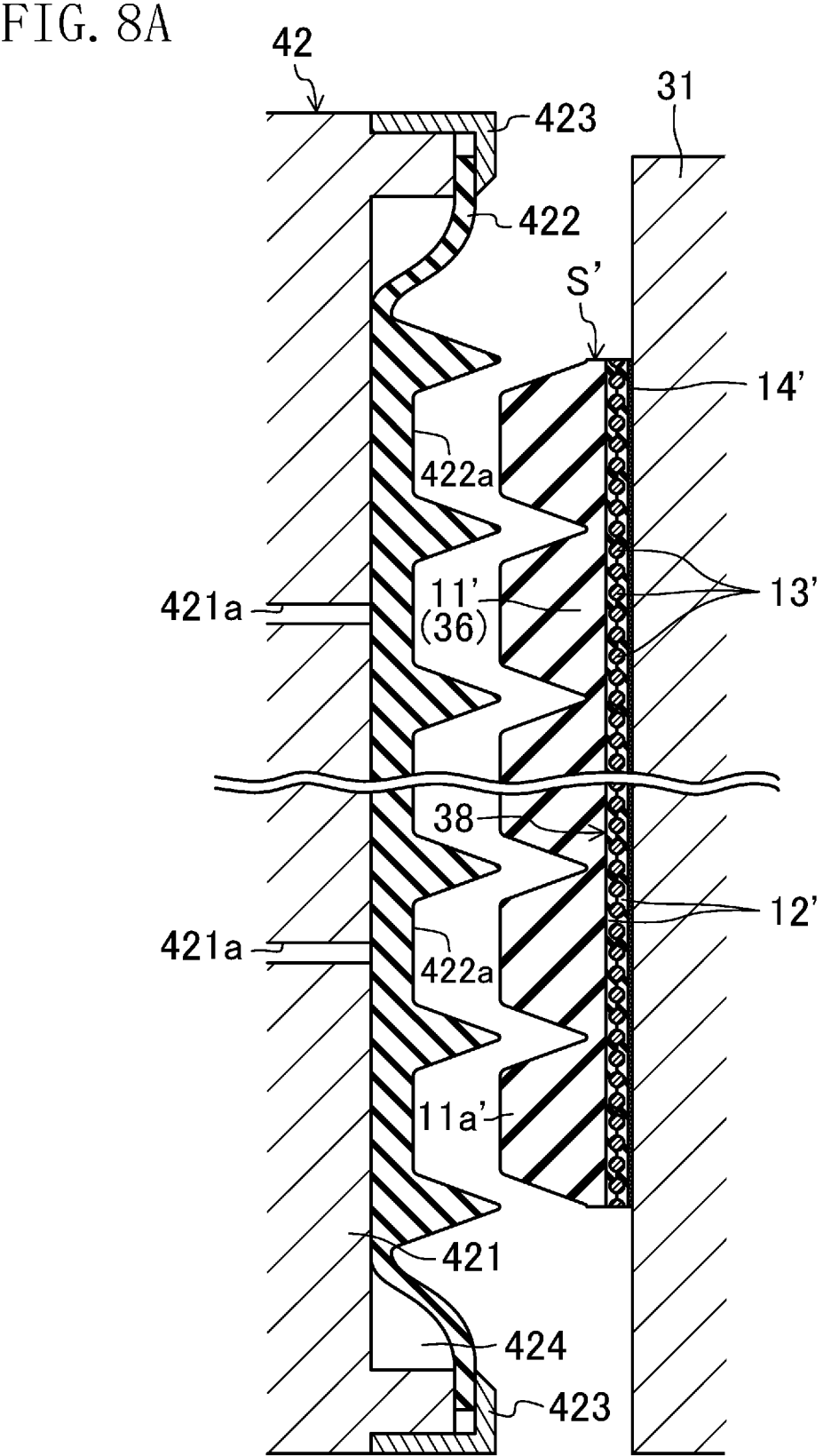
FIG. 8A is a first diagram for showing a crosslinking step of the first production method of the first embodiment, using the different crosslinking apparatus.

In the crosslinking step using this crosslinking apparatus 40, first, the pressurizing/depressurizing means depressurizes the inside of the hollow 424 through the air-passage holes 421a, as illustrated in FIG. 8A, to draw the expansion sleeve 422 to the inner peripheral surface of the drum body 421, thereby increasing the inner diameter of the space located radially inward of the expansion sleeve 422.

Figure 8B:
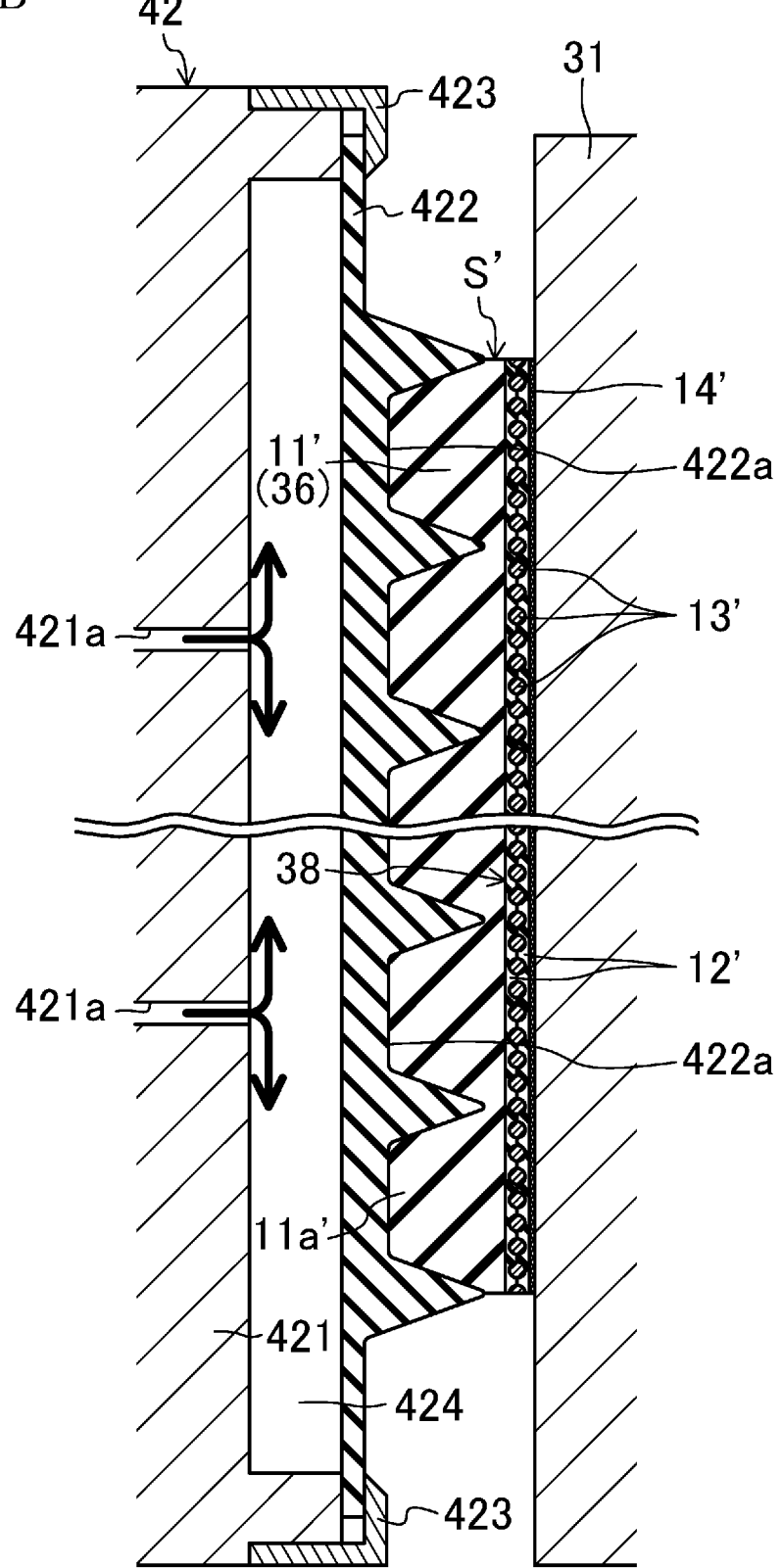
FIG. 8B is a second diagram for showing the crosslinking step of the first production method of the first embodiment, using the different crosslinking apparatus.

Next, the mandrel 31, on which the uncrosslinked slab S' is formed, is placed radially inward of the drum member 42 so as to be coaxial with the central axis of the crosslinking apparatus 40. In placing the mandrel 31, the uncrosslinked slab S' including the shaped structure 36 having a cylindrical shape is placed radially inward of the expansion sleeve 422, and each compression layer-forming portion 11a' of the uncrosslinked slab S' is positioned at an opening of an associated one of the compression layer-shape grooves 422a of the expansion sleeve 422. It is suitable to select such a drum member 42 in which the inner diameter at the bottom of the compression layer-shape groove 422a of the expansion sleeve 422 located at a normal position after release from the depressurization of the inside of the hollow 424, as illustrated in FIG. 8B, is the same as, or slightly larger than or slightly smaller than, the outer diameter of the uncrosslinked slab S' provided on the mandrel 31, in order to reduce looseness of the expansion sleeve 422 when expanded radially inward (which will be described later) and improve the precision of the molded shape. Note that short fibers, resin powder, or the like may be attached to the inner peripheral surface of the expansion sleeve 422 and/or the outer peripheral surface of the uncrosslinked slab S' in advance.

The temperature of the mandrel 31 is increased by the heating means, and the pressurizing/depressurizing means introduces high-pressure air between the drum body 421 and the expansion sleeve 422 through the air-passage holes 421a so as to expand the expansion sleeve 422 radially inward. This state is maintained for a predetermined period of time. That is, the pressing of the shaped structure 36 toward the mandrel 31 is carried out by the expansion sleeve 422 expanding radially inward. A cylindrical belt slab S is formed in this manner, similarly to the case using the crosslinking apparatus 40 illustrated in FIGS. 5A and 5B.

After a lapse of the predetermined period of time, the pressure applied by the pressurizing/depressurizing means is released, and the inside of the hollow 424 is simultaneously depressurized to draw the expansion sleeve 422 to the inner peripheral surface of the drum body 421, thereby increasing the inner diameter of the space located radially inward of the expansion sleeve 422. The restraint on the mandrel 31, on which the belt slab S has been formed, is therefore removed.

Figure 7:
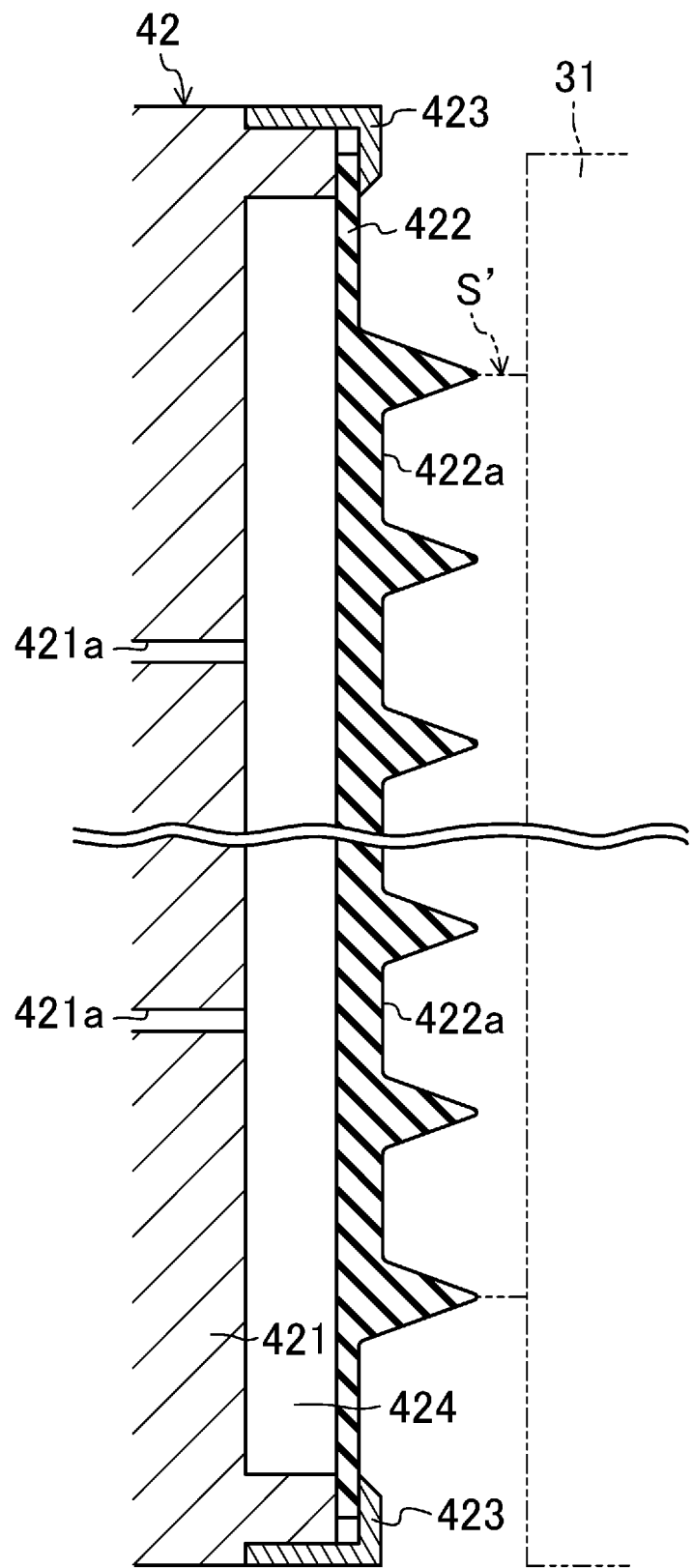
FIG. 7 illustrates, on an enlarged scale, a cross-sectional view of a portion of a different crosslinking apparatus for use in the first production method of the first embodiment.

The crosslinking apparatus 40 illustrated in FIG. 7 causes less deformation, and hence less looseness, of the expansion sleeve 422 when the expansion sleeve 422 is expanded radially inward, compared with the crosslinking apparatus 40 illustrated in FIGS. 5A and 5B. The precision of the molded shape can thus be further improved.

<Finishing Step>

In the finishing step, the mandrel 31 is taken out from the drum member 42 and is cooled. After that, the belt slab S is removed from the mandrel 31.

Figure 9:
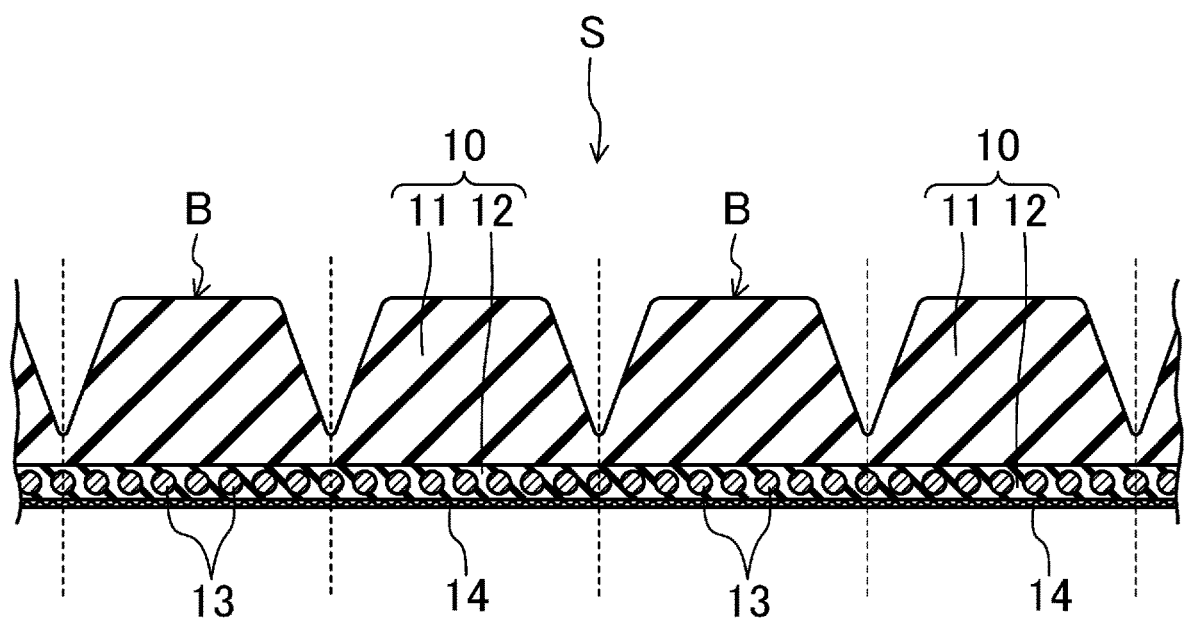
FIG. 9 is a diagram for showing a finishing step of the first production method of the first embodiment.

As shown in FIG. 9, the belt slab S that has been removed from the drum member 42 is cut into ring-shaped pieces such that one ring-shaped piece corresponds to one compression layer-forming portion 11a'. Each piece is turned inside out, thereby obtaining the V-belt B of the first embodiment. If necessary, a surface treatment such as grinding may be provided to the outer peripheral surface of the belt slab S before being cut into the ring-shaped pieces, or the surface, of the V-belt B, adjacent to the compression layer 11 after the cutting into the ring-shaped pieces.

The above-described first production method of a V-belt using the cylindrical expansion sleeve 422 made of elastomer is new (not found in the conventional techniques) and effective. According to the first production method of the V-belt B, the uncrosslinked slab S' includes a shaped structure 36 made of the compressed rubber sheet 11' of the uncrosslinked rubber composition and having a cylindrical shape. The shaped structure 36 has, on its outer peripheral surface, the compression layer-forming portions 11a' which are a plurality of ridges extending in the circumferential direction and arranged adjacent to one another in the axial direction. On the other hand, the expansion sleeve 422 has, on its inner peripheral surface, a plurality of compression layer-shape grooves 422a which extend in the circumferential direction and are arranged adjacent to one another in the axial direction of the expansion sleeve 422. According to the first production method, the shaped structure 36 included in the uncrosslinked slab S' is placed radially inward of the expansion sleeve 422, and the belt slab S is formed while the compression layer-forming portions 11a', to be the compression layer 11, which are the plurality of ridges of the shaped structure 36 are each fitted to an associated one of the compression layer-shape groove 422a of the expansion sleeve 422. The thus obtained belt slab S is cut into ring-shaped pieces such that one ring-shape piece corresponds to one compression layer-forming portion 11a', thereby obtaining the V-belt B. Thus, no waste rubber is generated at least through the formation of inclined surfaces on both sides in the width direction of the belt. The generation of the waste rubber can thus be reduced to a small amount throughout the production steps of the raw edge V-belt B.

(Second Production Method)

A second production method will be described with reference to FIGS. 10A and 10B and FIGS. 11A to 11E.

Figure 10A:
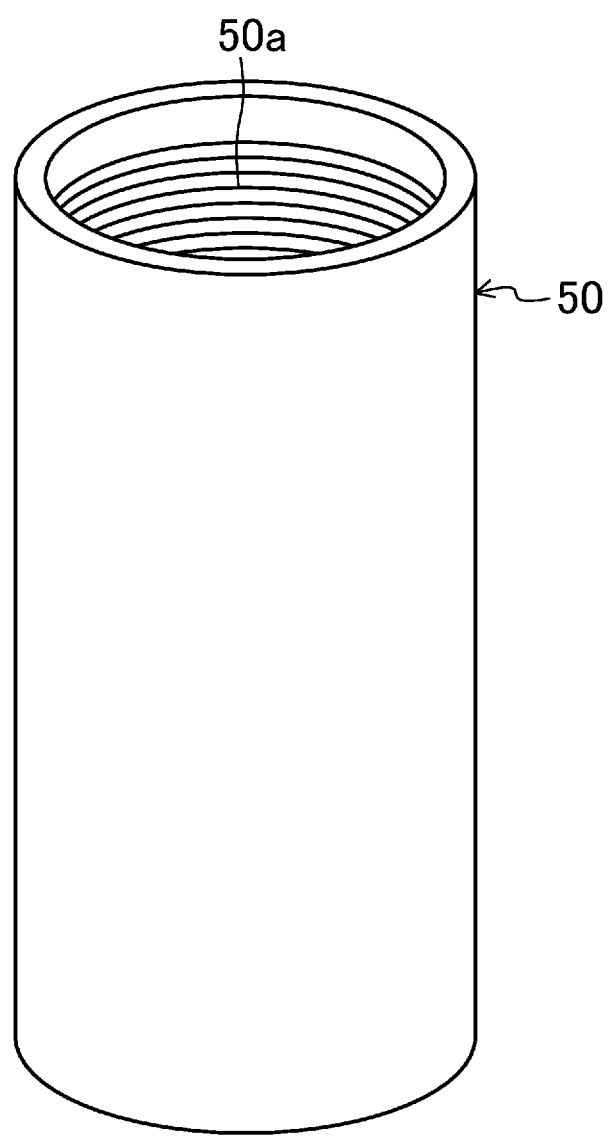
FIG. 10A illustrates a perspective view of a sleeve belt mold for use in a second production method of the first embodiment.
Figure 10B:
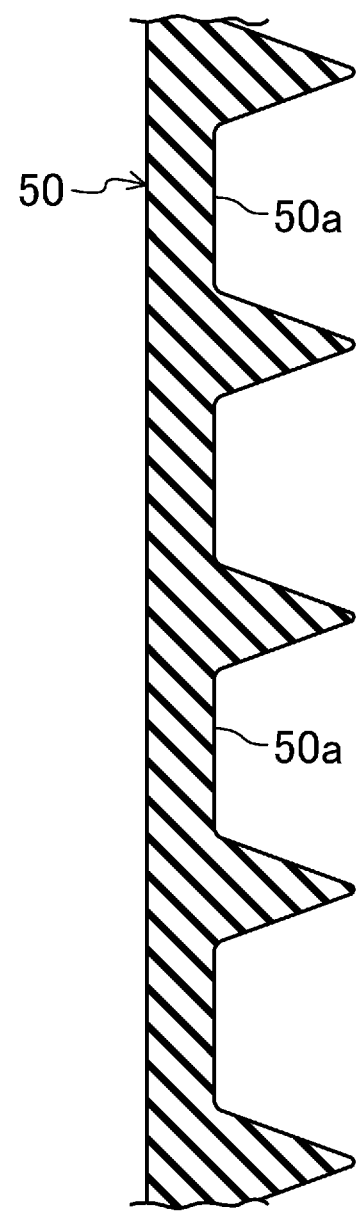
FIG. 10B illustrates, on an enlarged scale, a perspective view of a portion of the sleeve belt mold for use in the second production method of the first embodiment.

FIGS. 10A and 10B illustrate a sleeve belt mold 50 for use in the second production method.

The sleeve belt mold 50 has a cylindrical shape and is made of an elastomer, such as rubber and resin. The sleeve belt mold 50 has, on its inner peripheral surface, a plurality of compression layer-shape grooves 50a which extend in the circumferential direction and are arranged adjacent to one another in the axial direction of the sleeve belt mold 50. Each compression layer-shape groove 50a has a width decreasing toward its groove bottom. Specifically, each compression layer-shape groove 50a has the same isosceles trapezoidal cross section as the compression layer 11 of the V-belt B to be produced.

In the shaping step of the second production method, an uncrosslinked slab S' is formed on the mandrel 31 like the step of the first production method shown in FIG. 4D.

Figure 11A:
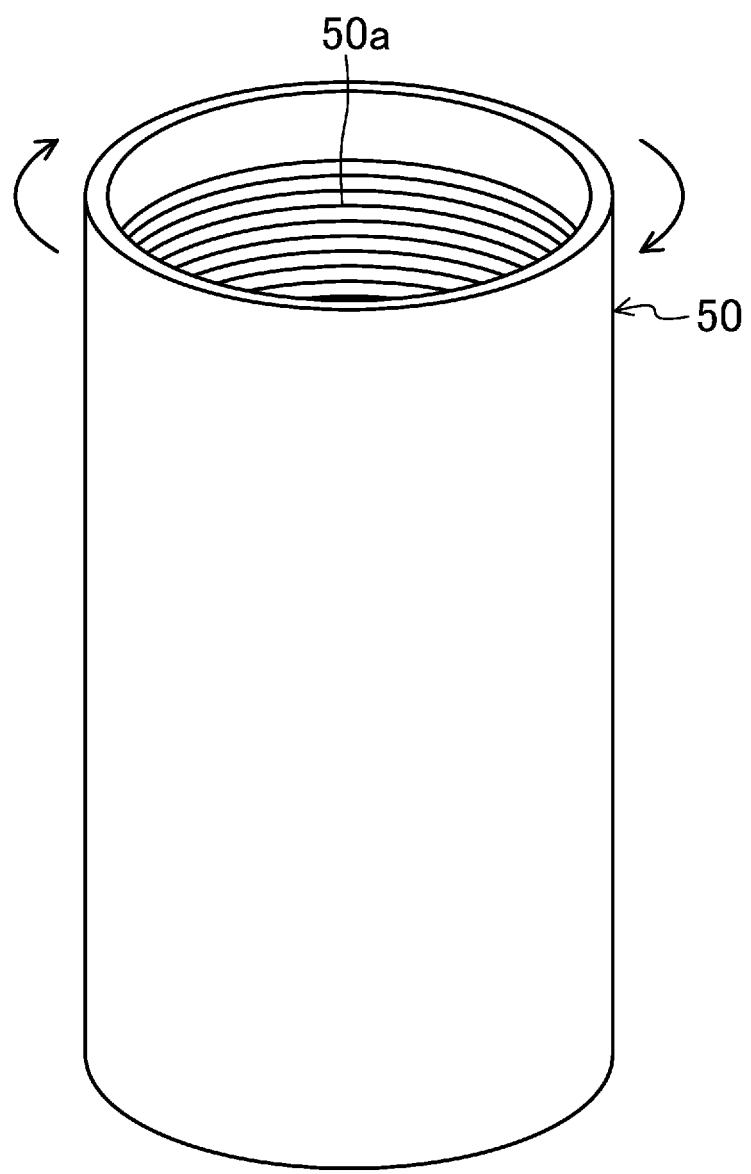
FIG. 11A is a first diagram for showing a crosslinking step of the second production method of the first embodiment.

In the crosslinking step, as illustrated in FIG. 11A, the sleeve belt mold 50 is rotated on its axis at high speed. At this moment, the inner diameter of the sleeve belt mold 50 increases due to a centrifugal force.

Figure 11B:
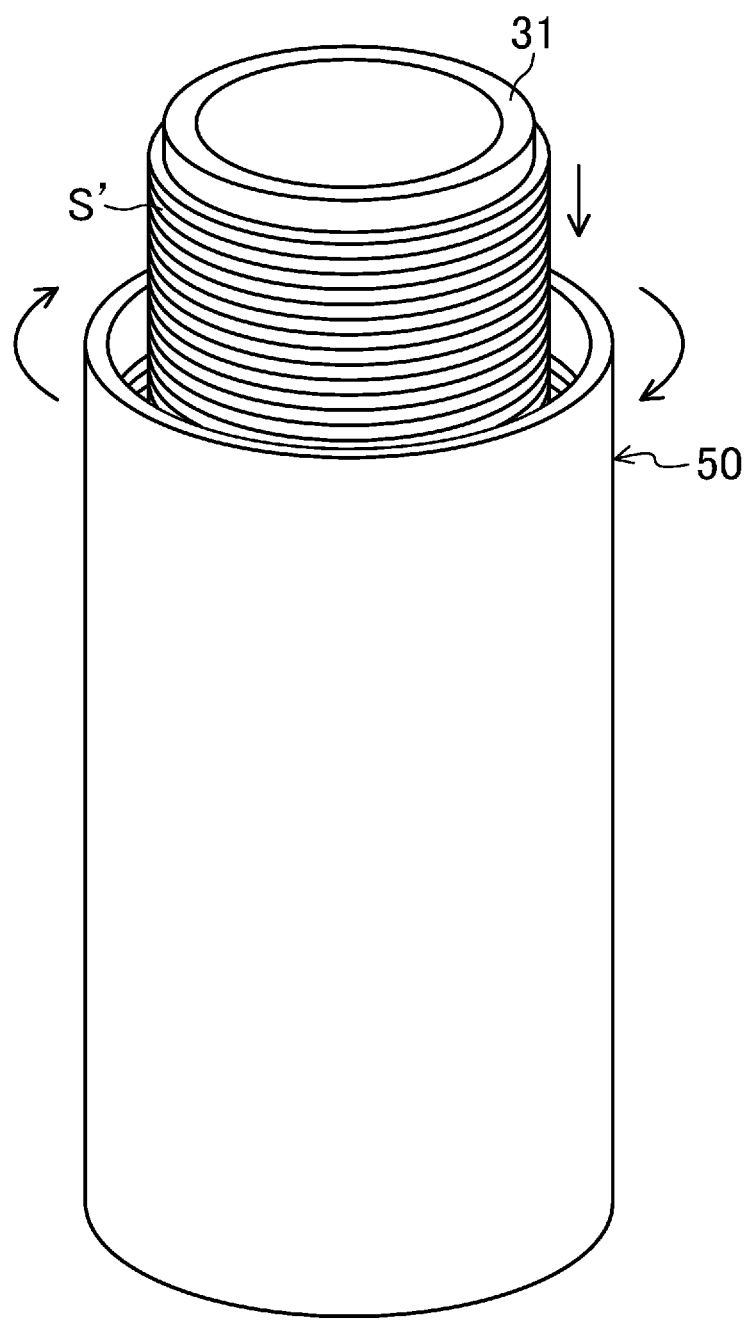
FIG. 11B is a second diagram for showing the crosslinking step of the second production method of the first embodiment.
Figure 11C:
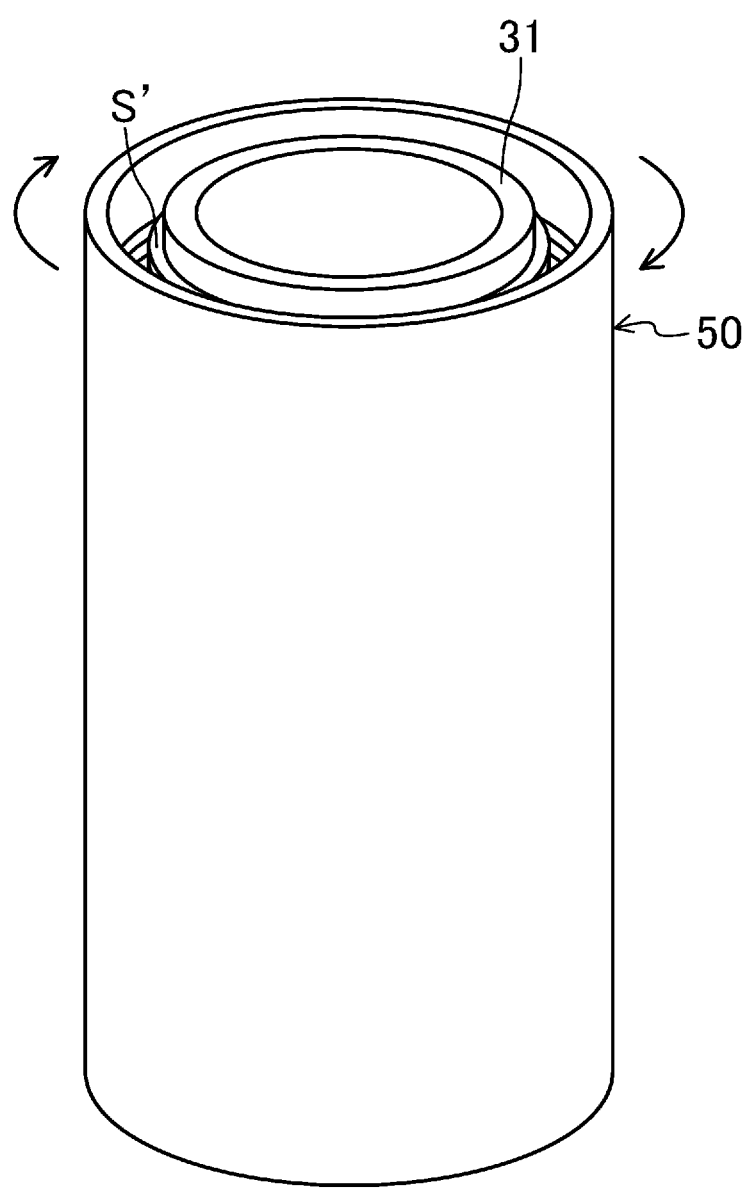
FIG. 11C is a third diagram for showing the crosslinking step of the second production method of the first embodiment.

Next, as illustrated in FIGS. 11B and 11C, the mandrel 31, on which the uncrosslinked slab S' is formed, is placed radially inward of the rotating sleeve belt mold 50 so as to be coaxial with the central axis of the sleeve belt mold 50. At this moment, the mandrel 31 is placed such that each of the compression layer-forming portions 11a' on the outer periphery of the uncrosslinked slab S' faces an associated one of the compression layer-shape grooves 50a of the sleeve belt mold 50. The sleeve belt mold 50 is chosen to correspond to the length of the V-belt B to be produced. Note that short fibers, resin powder, or the like may be attached to the inner peripheral surface of the sleeve belt mold 50 and/or the outer peripheral surface of the uncrosslinked slab S' in advance.

Figure 11D:
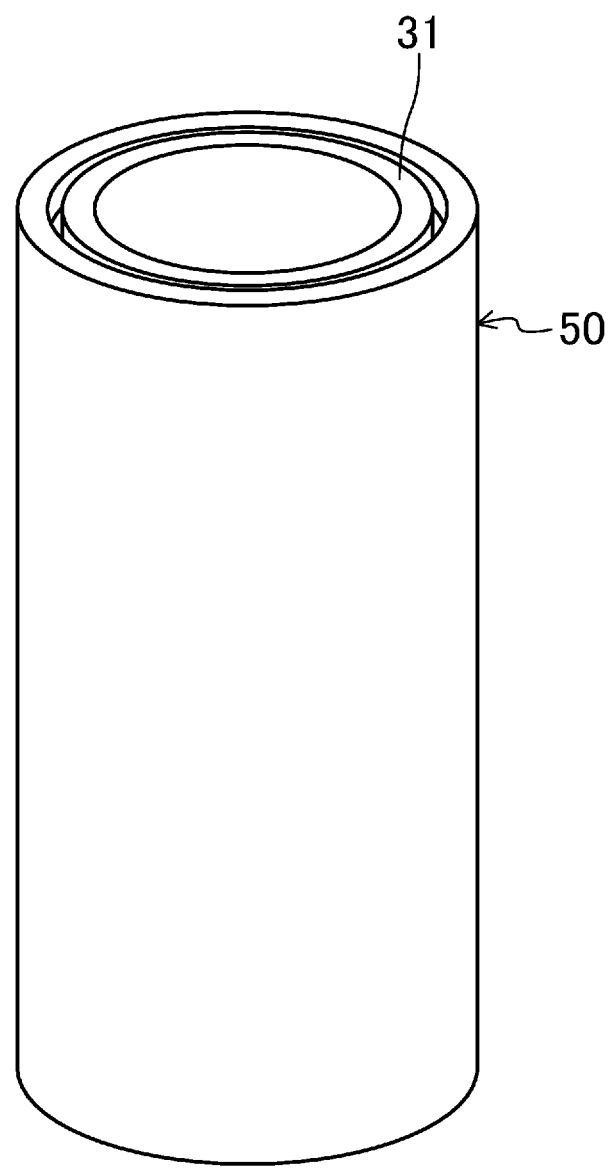
FIG. 11D is a fourth diagram for showing the crosslinking step of the second production method of the first embodiment.
Figure 11E:
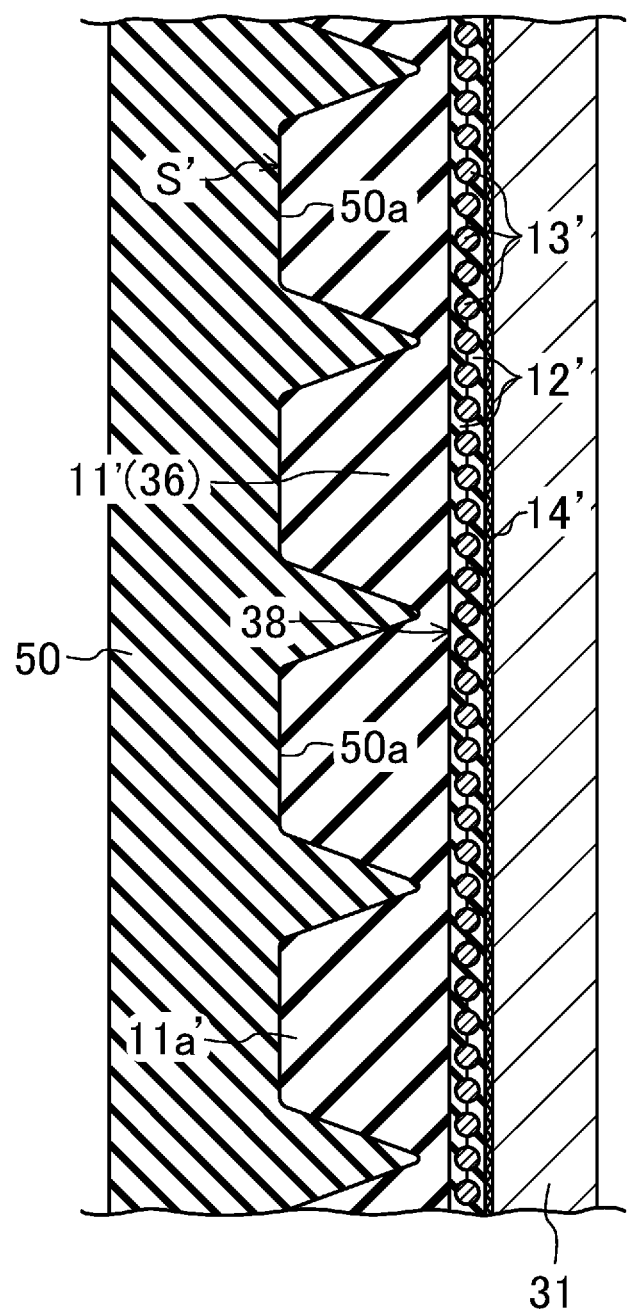
FIG. 11E is a fifth diagram for showing the crosslinking step of the second production method of the first embodiment.

Next, as illustrated in FIGS. 11D and 11E, the axial rotation of the sleeve belt mold 50 is stopped. At this moment, the inner diameter of the sleeve belt mold 50 decreases, and the uncrosslinked slab S' including the shaped structure 36 having a cylindrical shape is positioned radially inward of the sleeve belt mold 50 having a cylindrical shape. In summary, in order to place the shaped structure 36 radially inward of the sleeve belt mold 50, the mandrel 31 provided with the shaped structure 36 is placed radially inward of the sleeve belt mold 50 which is rotating on its axis and thus having an increased inner diameter. After that, the axial rotation of the sleeve belt mold 50 is stopped to decrease the inner diameter. Suitably, at this moment, each of the compression layer-forming portions 11a' on the outer periphery of the uncrosslinked slab S' is fitted in an associated one of the compression layer-shape grooves 50a of the sleeve belt mold 50. That is, suitably, the compression layer-forming portions 11a' are fitted in the compression layer-shape grooves 50a prior to heating the shaped structure 36 and pressing the shaped structure 36 toward the mandrel 31.

The mandrel 31 in the sleeve belt mold 50 is then placed in a vulcanizer and kept under predetermined temperature and a predetermined pressure for a predetermined period of time. At this moment, the uncrosslinked slab S' receives a compression force applied in a radially inward direction, causing each of the compression layer-forming portions 11a' to be fitted in an associated one of the compression layer-shape groove 50a of the sleeve belt mold 50. While in this state, the uncrosslinked slab S' is heated and pressed against the mandrel 31 by a pressure applied through the sleeve belt mold 50. In addition, the rubber components contained in the compressed rubber sheet 11' and the tensile rubber sheets 12' that are included in the uncrosslinked slab S' are crosslinked and integrated with one another. As a result, a continuous structure of belt bodies 10 for a plurality of V-belts B, each including the compression layer 11 and the tensile layer 12, is produced. At the same time, the rubber components adhere to, and are combined with, the cord 13' and the reinforcing fabric 14'. A cylindrical belt slab S is thus formed eventually. The heating is carried out at a temperature of 100° C. to 180° C., for example. The pressurization is carried out at a pressure of 0.5 MPa to 2.0 MPa, for example. The process continues for 10 minutes to 60 minutes, for example.

In the finishing step, the mandrel 31 is taken out from the vulcanizer and is cooled. After that, the mandrel 31 is detached from the belt slab S, and the belt slab S is removed from inside of the sleeve belt mold 50.

The other features and advantages are the same as those of the first production method.

(Third Production Method)

A third production method will be described with reference to FIG. 12 and FIGS. 13A to 13D.

Figure 12:
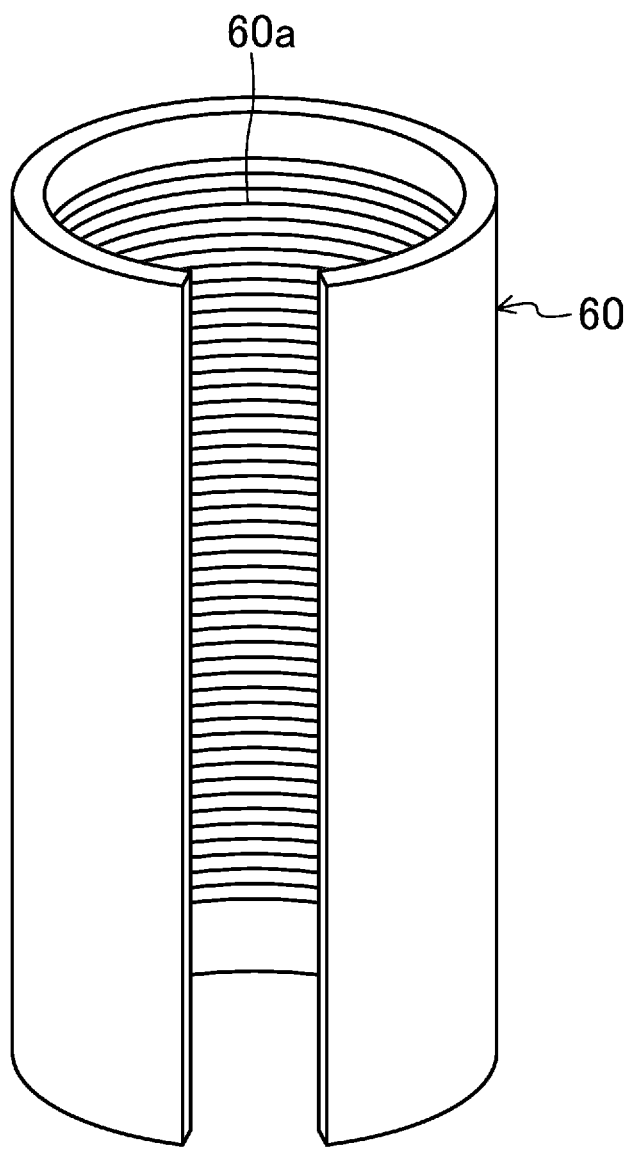
FIG. 12 illustrates a perspective view of a sheet belt mold for use in a third production method of the first embodiment.

FIG. 12 illustrates a sheet belt mold 60 for use in the third production method.

The sheet belt mold 60 is a curved rectangular sheet made of an elastomer, such as rubber and resin. The sheet belt mold 60 has, on its inner peripheral surface, a plurality of compression layer-shape grooves 60a which extend in the circumferential direction and are arranged adjacent to one another in the axial direction of the sheet belt mold 60. Each compression layer-shape groove 60a has a width decreasing toward its groove bottom, similarly to the compression layer-shape groove 50a, shown in FIG. 10B, of the sleeve belt mold 50 for use in the second production method. Specifically, each compression layer-shape groove 60a has the same isosceles trapezoidal cross section as the compression layer 11 of the V-belt B to be produced. Both ends of the sheet belt mold 60 are butted together to form a cylindrical object, which serves as a cylindrical belt mold made of the elastomer and having, on its inner peripheral surface, a plurality of compression layer-shape grooves 60a which extend in the circumferential direction and are arranged adjacent to one another in the axial direction of the cylindrical belt mold. That is, in the third production method, a cylindrical belt mold is configured as a cylindrical object formed by butting both ends of the sheet belt mold 60.

In the shaping step of the third production method, an uncrosslinked slab S' is formed on the mandrel 31 like the step of the first production method shown in FIG. 4D.

Figure 13A:
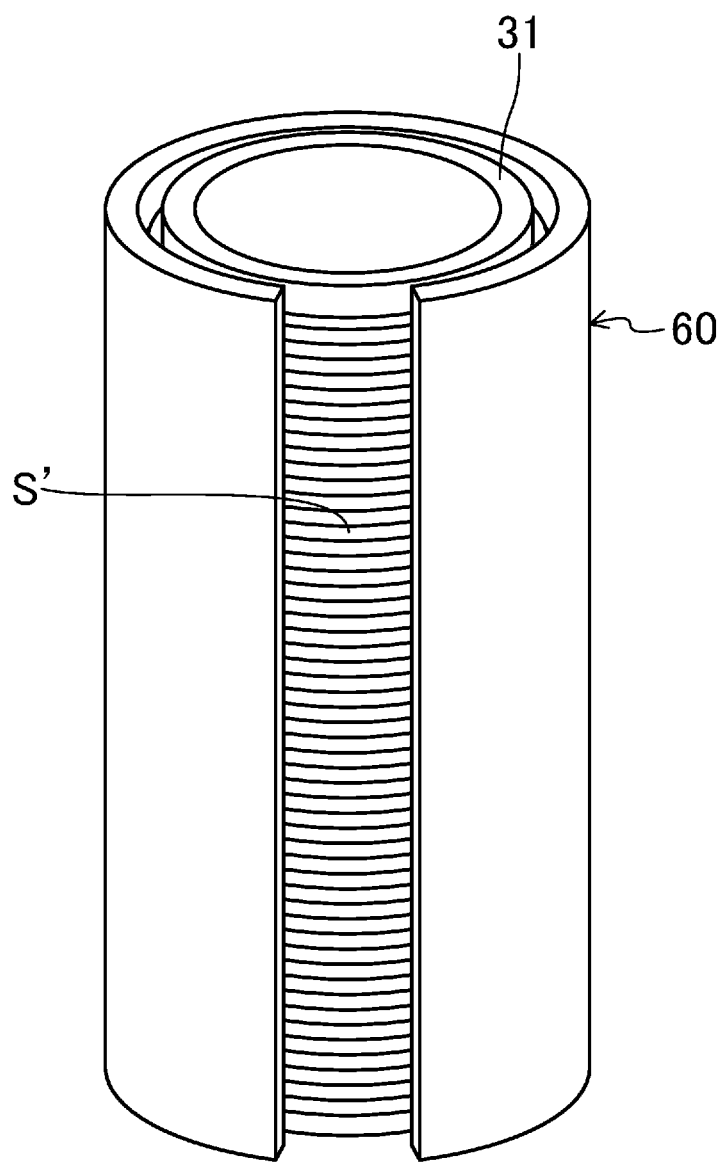
FIG. 13A is a first diagram for showing a crosslinking step of the third production method of the first embodiment.
Figure 13B:
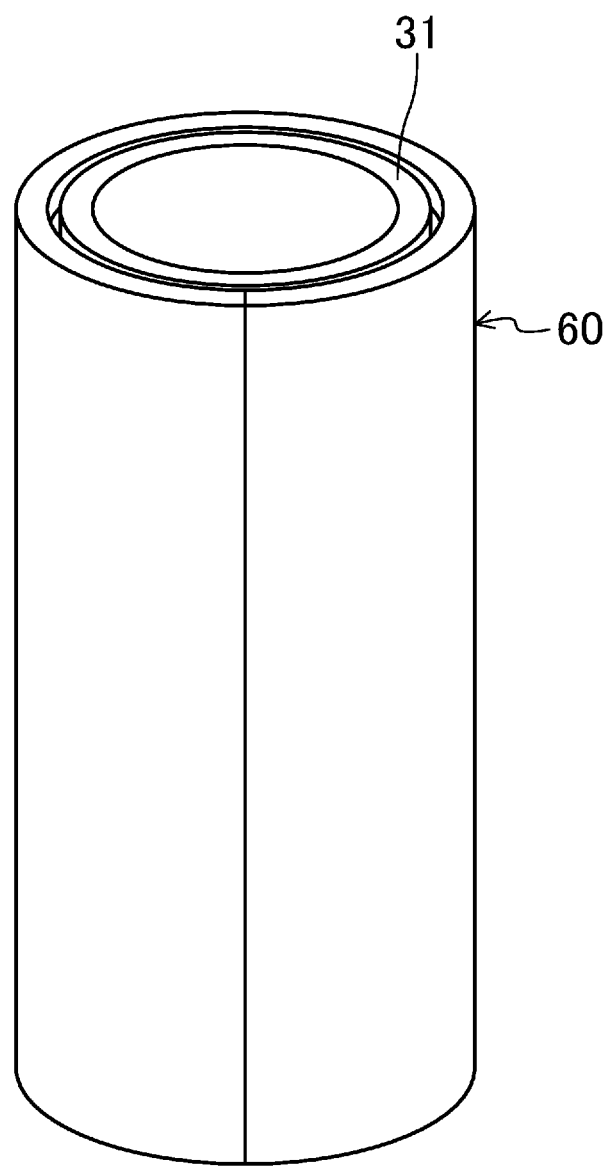
FIG. 13B is a second diagram for showing the crosslinking step of the third production method of the first embodiment.

In the crosslinking step, as illustrated in FIGS. 13A and 13B, the sheet belt mold 60 is wrapped around the uncrosslinked slab S' provided on the mandrel 31. At this moment, the uncrosslinked slab S' including the shaped structure 36 having a cylindrical shape is positioned radially inward of the cylindrical belt mold made of the sheet belt mold 60. Suitably, at this moment, each of the compression layer-forming portions 11a' on the outer periphery of the uncrosslinked slab S' is fitted in an associated one of the compression layer-shape grooves 60a of the sheet belt mold 60. That is, suitably, the compression layer-forming portions 11a' are fitted in the compression layer-shape grooves 60a prior to heating the shaped structure 36 and pressing the shaped structure 36 toward the mandrel 31. The sheet belt mold 60 is chosen to correspond to the length of the V-belt B to be produced. Note that short fibers, resin powder, or the like may be attached to a surface of the sheet belt mold 60 where the compression layer-shape grooves 60a are formed and/or the outer peripheral surface of the uncrosslinked slab S' in advance.

Figure 13C:
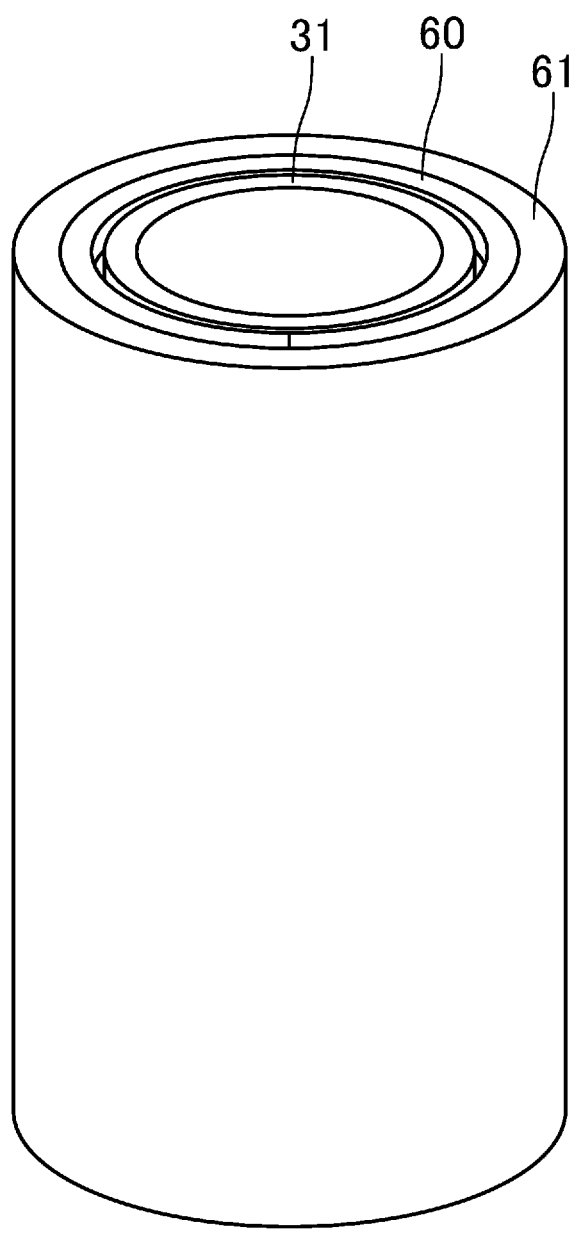
FIG. 13C is a third diagram for showing the crosslinking step of the third production method of the first embodiment.

Next, as illustrated in FIG. 13C, a cylindrical clamping sleeve 61 made of rubber is fitted over the sheet belt mold 60. Unwrapping of the sheet belt mold 60 is restricted in this manner.

The mandrel 31 in the sheet belt mold 60 and the clamping sleeve 61 is then placed in a vulcanizer and kept under predetermined temperature and a predetermined pressure for a predetermined period of time. At this moment, the uncrosslinked slab S' receives a compression force applied in a radially inward direction, causing each of the compression layer-forming portions 11a' to be fitted in an associated one of the compression layer-shape groove 60a of the sheet belt mold 60. While in this state, the uncrosslinked slab S' is heated and pressed against the mandrel 31 by a pressure applied through the cylindrical slab and the sheet belt mold 60. In addition, the rubber components contained in the compressed rubber sheet 11' and the tensile rubber sheets 12' that are included in the uncrosslinked slab S' are crosslinked and integrated with one another. As a result, a continuous structure of belt bodies 10 for a plurality of V-belts B, each including the compression layer 11 and the tensile layer 12, is produced. At the same time, the rubber components adhere to, and are combined with, the cord 13' and the reinforcing fabric 14'. A cylindrical belt slab S is thus formed eventually. The heating is carried out at a temperature of 100° C. to 180° C., for example. The pressurization is carried out at a pressure of 0.5 MPa to 2.0 MPa, for example. The process continues for 10 minutes to 60 minutes, for example.

In the finishing step, the mandrel 31 is taken out from the vulcanizer and is cooled. After that, the clamping sleeve 61 and the sheet belt mold 60 are detached, and the mandrel 31 is removed to obtain a belt slab S.

The other features and advantages are the same as those of the first production method.

According to the third production method using the sheet belt mold 60, both ends of the sheet belt mold 60 are butted together to form a cylindrical shape. A joint portion may thus be formed on the inner peripheral surface of the sheet belt mold 60. The joint portion may create a step in the belt slab S. In view of this, the first production method or the following fourth production method using, as a belt mold, the cylindrical expansion sleeve 422 which does not have a joint portion on the inner peripheral surface, or the second production method using the cylindrical sleeve belt mold is suitable.

(Fourth Production Method)

A fourth production method will be described below with reference to FIG. 14.

According to the fourth production method, the compressed rubber sheet 11' is cut, in the shaping step, so as to have a length which corresponds to the length of the V-belt B to be produced. Ends of the compressed rubber sheet 11' are cut with an ultrasound cutter or the like, and are butt jointed with an ultrasound welder or the like such that the compression layer-forming portions 11a' face outside and extend in the circumferential direction. To increase the joint strength, the butt joint is suitably achieved by abutting surfaces, of the compressed rubber sheet 11', which are oblique with respect to the thickness direction of the compressed rubber sheet 11'. A shaped structure 36 which has a cylindrical shape is produced in this manner. The shaped structure 36 is made of the uncrosslinked rubber composition and has, on its outer peripheral surface, a plurality of compression layer-forming portions 11a' which are the ridges extending in the circumferential direction and arranged adjacent to one another in the axial direction.

Further, similarly to the steps of the first production method shown in FIGS. 4A to 4C, the reinforcing fabric 14', the tensile rubber sheet 12', the cord 13', and another tensile rubber sheet 12' are stacked on the mandrel 31 in the stated order. After that, the entire circumferential surface of the stacked structure is pressed with a roller 32 on the tensile rubber sheet 12' to integrate the stacked structure and produce a cylindrical tensile member 38.

Figure 14:
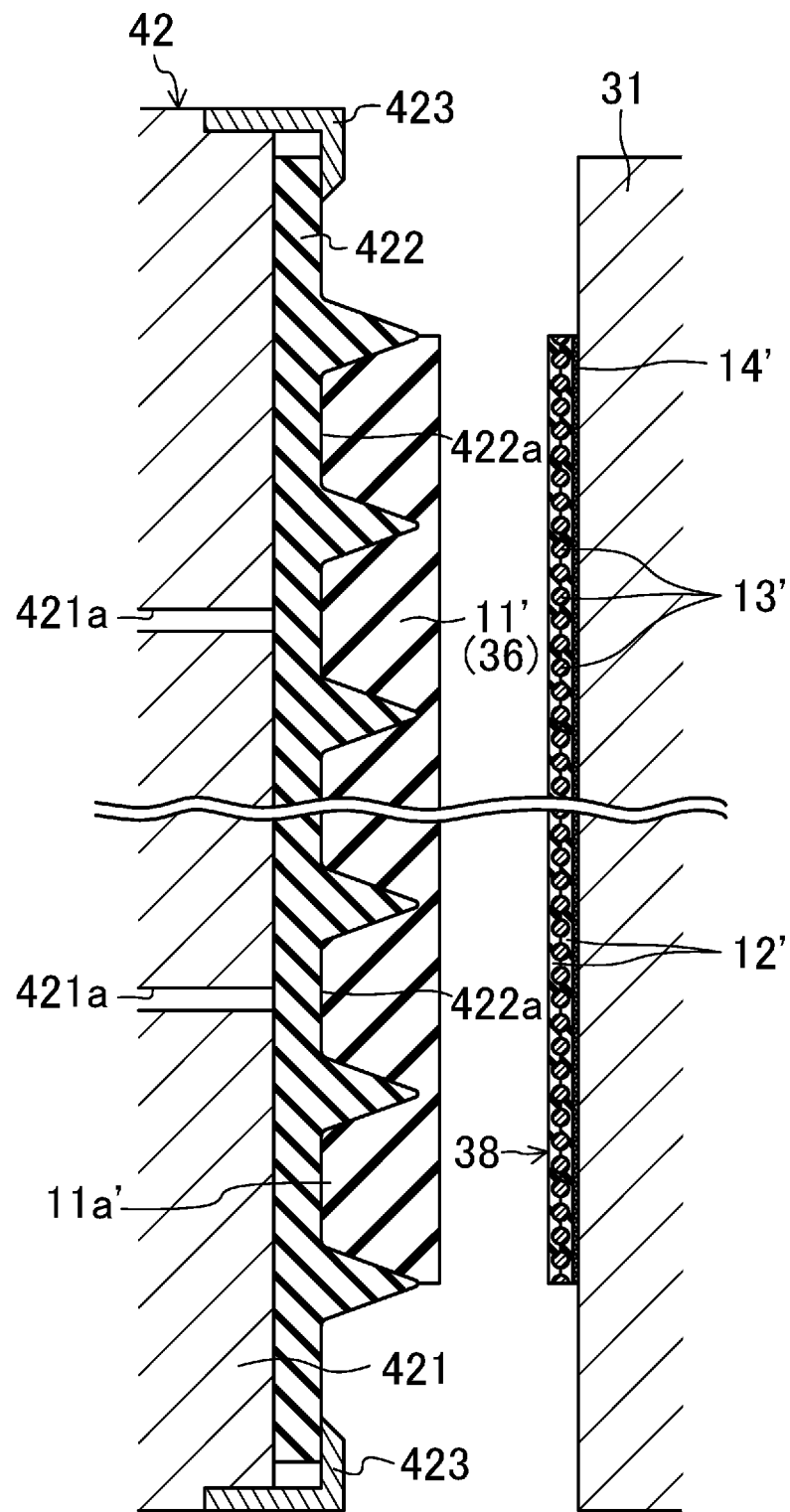
FIG. 14 is a diagram for showing a crosslinking step of a fourth production method of the first embodiment.

As shown in FIG. 14, the shaped structure 36 is placed radially inward of the expansion sleeve 422 in the crosslinking step using the crosslinking apparatus 40 illustrated in FIGS. 5A and 5B. Suitably, at this moment, the shaped structure 36 is set inside the expansion sleeve 422 such that each of the plurality of compression layer-forming portions 11a' of the shaped structure 36 is fitted in an associated one of the compression layer-shape grooves 422a of the expansion sleeve 422. That is, suitably, the compression layer-forming portions 11a' are fitted in the compression layer-shape grooves 422a prior to heating the shaped structure 36 and pressing the shaped structure 36 toward the mandrel 31. Fitting the compression layer-forming portions 11a' in the compression layer-shape grooves 422a in advance reduces stretch of the rubber, thereby enabling production of a V-belt B having a stable structure. It is suitable to select such a drum member 42 in which the inner diameter at the opening of the compression layer-shape groove 422a is slightly larger than the outer diameter of the tensile member 38 provided on the mandrel 31 in order to reduce looseness of the expansion sleeve 422 when expanded radially inward in this crosslinking step and improve the precision of the molded shape. Note that short fibers, resin powder, or the like may be attached to the inner peripheral surface of the expansion sleeve 422 and/or the outer peripheral surface of the shaped structure 36 in advance.

Further, the mandrel 31, on which the tensile member 38 is formed, is placed radially inward of the drum member 42 so as to be coaxial with the central axis of the crosslinking apparatus 40. At this moment, a gap is formed between the shaped structure 36 set in the expansion sleeve 422 and the tensile member 38 set on the mandrel 31.

The temperature of the mandrel 31 is increased by the heating means, and the pressurizing means introduces high-pressure air into the gap between the drum body 421 and the expansion sleeve 422 through the air-passage holes 421a so as to expand the expansion sleeve 422 radially inward. This state is maintained for a predetermined period of time. When the expansion sleeve 422 is expanded radially inward, the shaped structure 36 is pushed radially inward and comes into contact with the tensile member 38. The shaped structure 36 and the tensile member 38 in this state are heated by the mandrel 31, and are pressed toward the mandrel 31 by the expansion sleeve 422. A belt slab S is formed as a result.

Alternatively, the tensile member 38 may be removed from the mandrel 31, and then fitted to the inside of the shaped structure 36 provided on the expansion sleeve 422 so as to be in a positional relationship as in FIG. 6A illustrating the first production method. Next, the mandrel 31 having an outer diameter smaller than the inner diameter of the tensile member 38 may be placed radially inward of the drum member 42 so as to be coaxial with the central axis of the crosslinking apparatus 40. At this moment, a gap is formed between the tensile member 38 on the expansion sleeve 422 and the mandrel 31.

Alternatively, similarly to the first production method, an uncrosslinked slab S' may be formed on the mandrel 31. The uncrosslinked slab S' may be removed from the mandrel 31, and then fitted to the inside of the expansion sleeve 422 so as to be in a positional relationship as in FIG. 6A illustrating the first production method. Next, the mandrel 31 having an outer diameter smaller than the inner diameter of the uncrosslinked slab S' may be placed radially inward of the drum member 42 so as to be coaxial with the central axis of the crosslinking apparatus 40. At this moment, too, a gap is formed between the tensile member 38 on the expansion sleeve 422 and the mandrel 31.

In these cases, when the temperature of the mandrel 31 is increased by the heating means, and high-pressure air is introduced by the pressurizing means into the gap between the drum body 421 and the expansion sleeve 422 through the air-passage holes 421a so as to keep the expansion sleeve 422 expanding radially inward for a predetermined period of time, the expansion sleeve 422 expanding radially inward pushes the shaped structure 36 and the tensile member 38 or the uncrosslinked slab S' radially inward to come into contact with the mandrel 31. The shaped structure 36 and the tensile member 38 or the uncrosslinked slab S' in this state are heated by the mandrel 31, and are pressed toward the mandrel 31 by the expansion sleeve 422. A belt slab S is formed as a result.

The other features and advantages are the same as those of the first production method.

Second Embodiment

Figure 15:
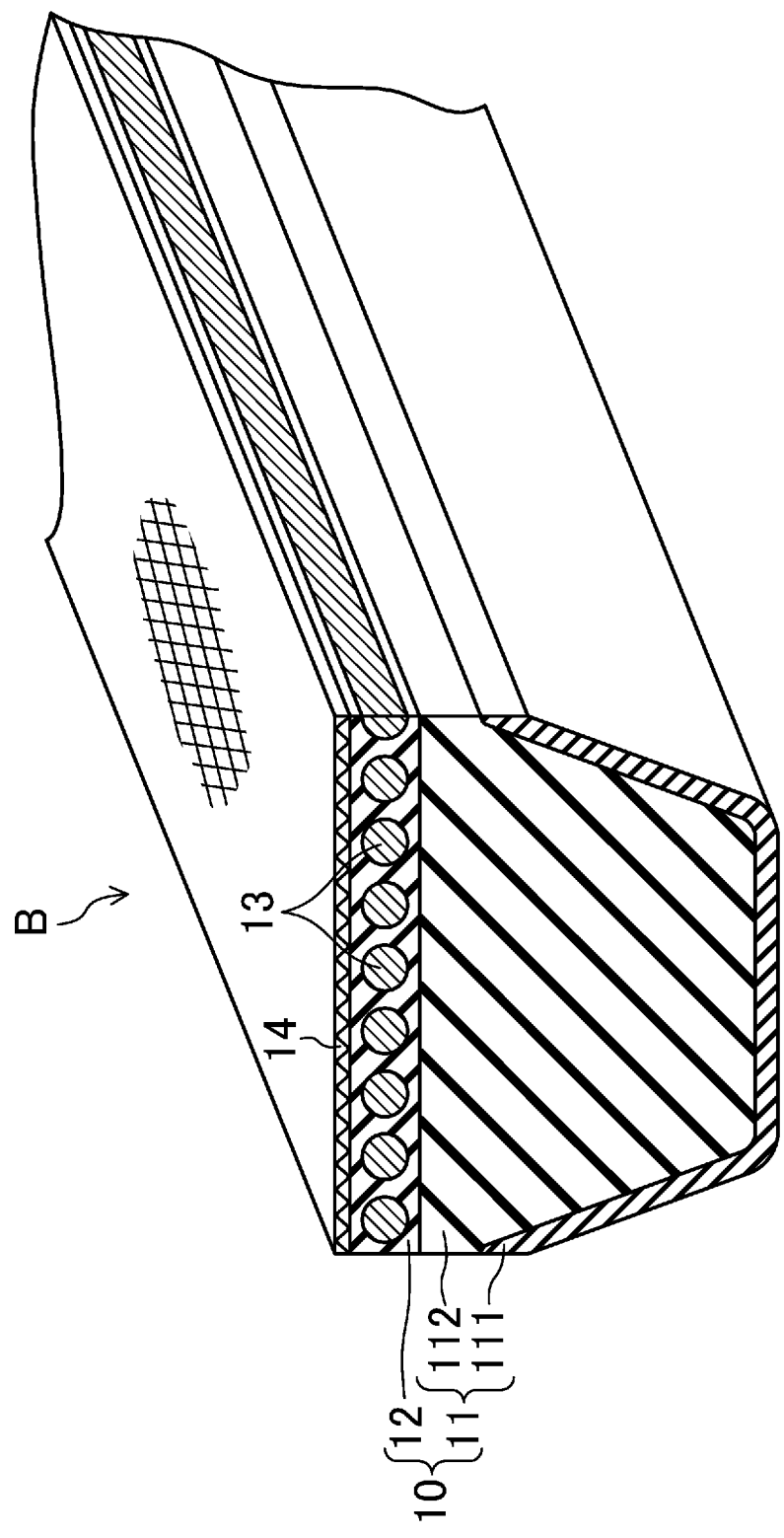
FIG. 15 illustrates a perspective view of a V-belt according to a second embodiment.

FIG. 15 illustrates a V-belt B of a second embodiment. Like reference characters have been used to designate the same elements as those in the first embodiment.

According to the second embodiment, the compression layer 11 of the V-belt B has a surface rubber layer 111 (a surface material) constituting a surface portion of the compression layer 11 and a core rubber layer 112 constituting an inner portion of the compression layer 11.

The surface rubber layer 111 and the core rubber layer 112 are made of different crosslinked rubber compositions, each of which is produced by crosslinking, through heating and pressurization, an uncrosslinked rubber composition prepared by kneading a rubber component and various compound ingredients together.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One kind or a blend of two or more kinds of these substances is suitable as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be blended with the rubber composition forming the surface rubber layer 111 include surface texture modifiers such as short fibers, fluororesin powder, polyethylene resin powder, hollow particles, and a foaming agent.

The other configurations are the same as those of the V-belt B of the first embodiment.

Production methods of the V-belt B according to the second embodiment will be described with reference to FIGS. 16A and 16B to FIG. 18.

The V-belt B of the second embodiment can be produced by a method similar to the first to fourth production methods of the first embodiment. In this embodiment, the compressed rubber sheet 11' is replaced with a surface rubber sheet 111' (a sheet material) for forming a surface rubber layer 111 and a compressed rubber sheet 112' for forming a core rubber layer 112. The core rubber sheet 112' formed into a cylindrical shape constitutes a shaped structure 36 having a cylindrical shape. The shaped structure 36 is made of an uncrosslinked rubber composition and has, on its outer peripheral surface, the core rubber layer-forming portions 112a' which are a plurality of ridges extending in the circumferential direction and arranged adjacent to one another in the axial direction.

In the component preparation step of first to fourth production methods, the surface rubber sheet 111' can be prepared by a method similar to the method for preparing the tensile rubber sheet 12'. Short fibers or resin powder may be previously attached to a surface, of the surface rubber sheet 111', which is to constitute a surface of the belt. The core rubber sheet 112' can be prepared by a method similar to the method for preparing the compressed rubber sheet 11' of the first production method shown in FIGS. 3A and 3B.

In forming the uncrosslinked slab S' by wrapping the core rubber sheet 112' with the surface rubber sheet 111' in the shaping step of the first to third production methods, the compressed rubber sheet 11' (compression layer-forming portions 11a') suitably consists of the core rubber sheet 112' (core rubber layer-forming portions 112a') and the surface rubber sheet 111' covering the core rubber sheet 112'. That is, it is suitable to form the compression layer-forming portions 11a' by covering the core rubber layer-forming portions 112a', which are ridges, with the surface rubber sheet 111' prior to heating the shaped structure 36 and pressing the shaped structure 36 toward the mandrel 31. The core rubber sheet 112' wrapped around the tensile member 38 may be covered with the surface rubber sheet 111', or the compressed rubber sheet 11' obtained by covering the core rubber sheet 112' with the surface rubber sheet 111' may be wrapped around the tensile member 38.

Figure 16A:
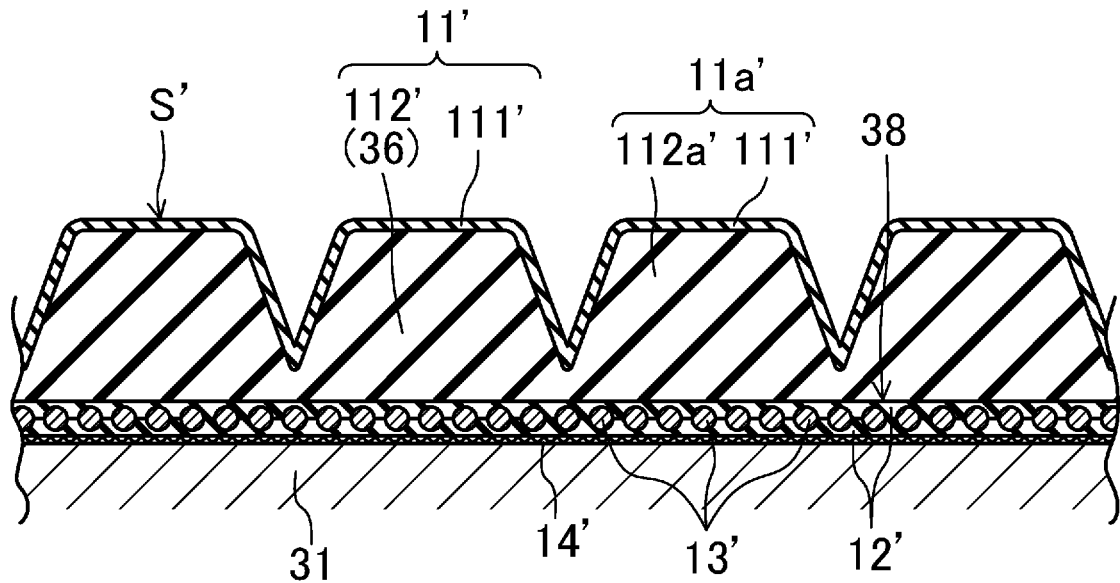
FIG. 16A is a first diagram for showing a shaping step of first to third production methods of the second embodiment.
Figure 16B:
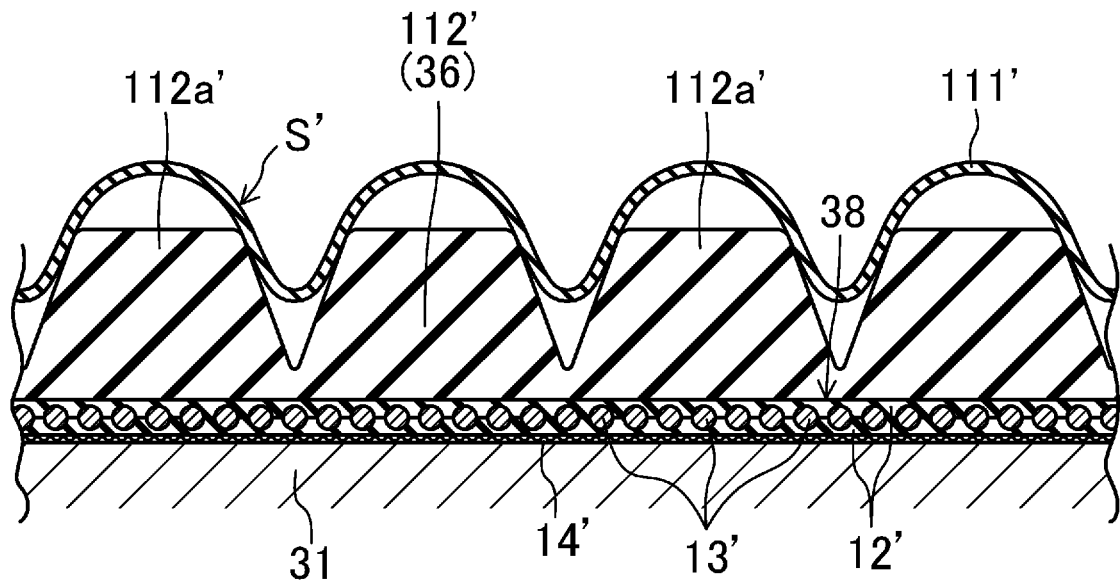
FIG. 16B is a second diagram for showing the shaping step of the first to third production methods of the second embodiment.

Covering the surface of the core rubber sheet 112' with the surface rubber sheet 111' in advance in this manner can reduce stretch of the surface rubber sheet 111' to a small amount, enabling production of the V-belt B including the surface rubber layer 111 having a substantially uniform thickness. Similarly, in order to reduce the stretch of the surface rubber sheet 111' to a small amount and achieve a uniform thickness of the surface rubber layer 111, the surface rubber sheet 111' is suitably subjected to a pleating process so that the cross section in the width direction is corrugated to have the same pitches as the core rubber layer-forming portions 112a', as shown in FIG. 16B, prior to covering the surface of the core rubber sheet 112' with the surface rubber sheet 111'. In addition, it is suitable that the surface rubber sheet 111' be positioned such that a portion of the surface rubber sheet 111' which protrudes toward the core rubber sheet 112' (the core rubber layer-forming portions 112a') is located at, and halfway fitted in, the groove between the core rubber layer-forming portions 112a of the core rubber sheet 112', so that the surface rubber sheet 111' may loosely fit the core rubber sheet 112'. Such a pleating process may include continuously passing the surface rubber sheet 111' between a pair of plate-like or roll members for pleating the surface rubber sheet 111' which originally has a flat shape. Suitably, the surface rubber sheet 111' is subjected to a pleating process so that pitches of the pleated shape gradually decrease in a length direction. The surface rubber sheet 111' may be closely fitted to the core rubber sheet 112', or may simply lie along the surface of the core rubber sheet 112' instead of being closely fitted.

Similarly, in wrapping the shaped structure 36 with the surface rubber sheet 111' in the shaping step of the fourth production method, the compressed rubber sheet 11' (compression layer-forming portions 11a') suitably consists of the core rubber sheet 112' (core rubber layer-forming portions 112a') and the surface rubber sheet 111' covering the core rubber sheet 112'.

Figure 17A:
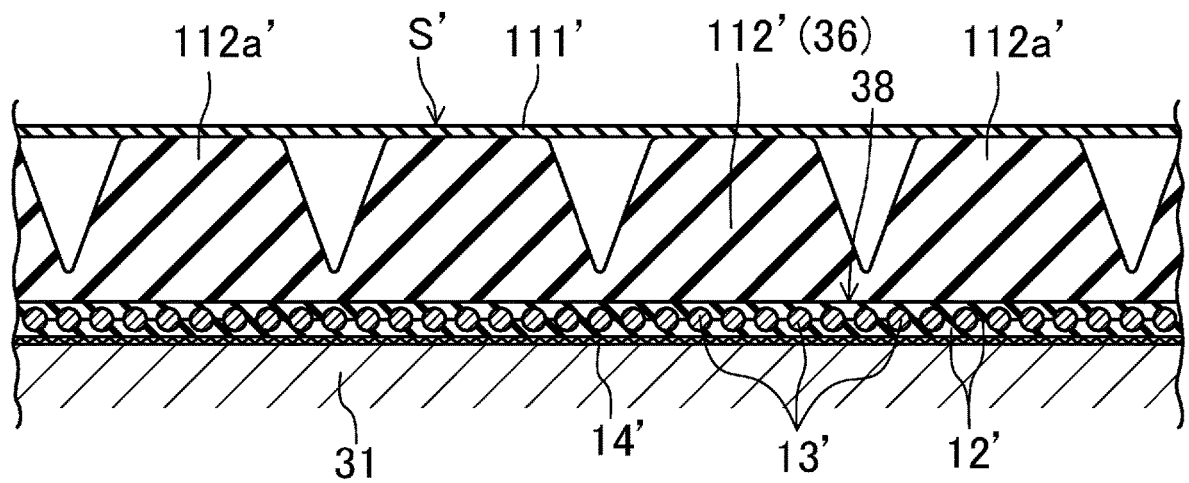
FIG. 17A is a diagram for showing a variation of a shaping step of the first to third production methods of the second embodiment.
Figure 17B:
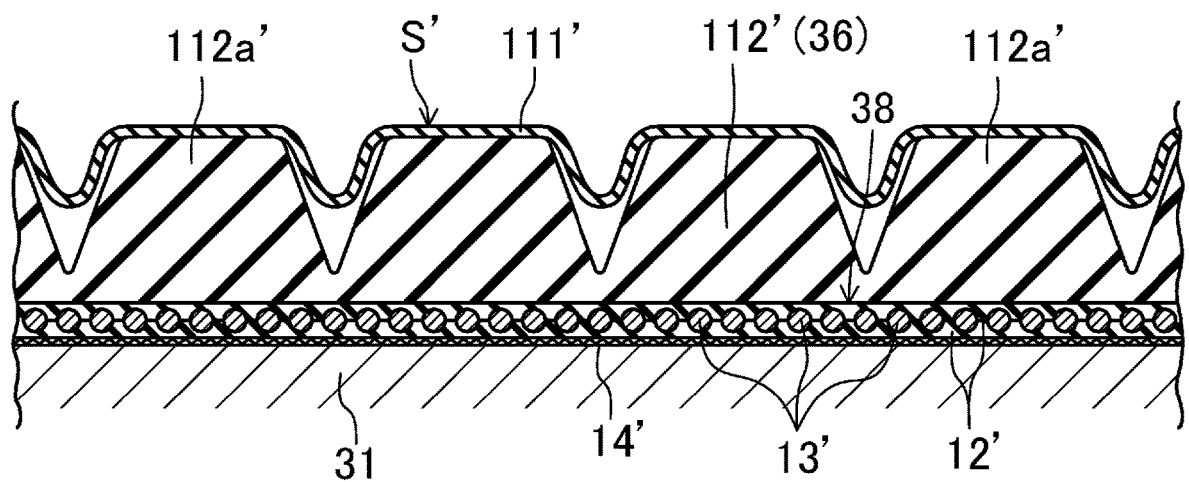
FIG. 17B is a diagram for showing another variation of the shaping step of the first to third production methods of the second embodiment.

In forming the uncrosslinked slab S' by wrapping the core rubber sheet 112' with the surface rubber sheet 111' in the shaping step of the first to third production methods, the surface rubber sheet 111' may be wrapped to have a cylindrical shape, while being supported on the tops of the core rubber layer-forming portions 112a' of the core rubber sheet 112', as illustrated in FIG. 17A. In order to reduce stretch of the surface rubber sheet 111' and make the surface rubber layer 111 have a uniform thickness, as shown in FIG. 17B, a portion of the surface rubber sheet 111' which corresponds to a groove between adjacent core rubber layer-forming portions 112a' of the core rubber sheet 112' may be halfway fitted in the groove between the adjacent core rubber layer-forming portions 112a' of the core rubber sheet 112'. For the same purpose, similarly to the step shown in FIG. 16B, the surface rubber sheet 111' is subjected to a pleating process so that the cross section in the width direction is corrugated to have the same pitches as the core rubber layer-forming portions 112a'. The surface rubber sheet 111' may be positioned such that a portion of the surface rubber sheet 111' which protrudes toward the core rubber sheet 112' is halfway fitted in a groove between the core rubber layer-forming portions 112a of the core rubber sheet 112', so that the surface rubber sheet 111' may loosely fit the core rubber sheet 112'. The core rubber sheet 112' wrapped around the tensile member 38 may be covered with the surface rubber sheet 111', or the core rubber sheet 112' around which the surface rubber sheet 111' has been wrapped may be wrapped around the tensile member 38.

Figure 18:
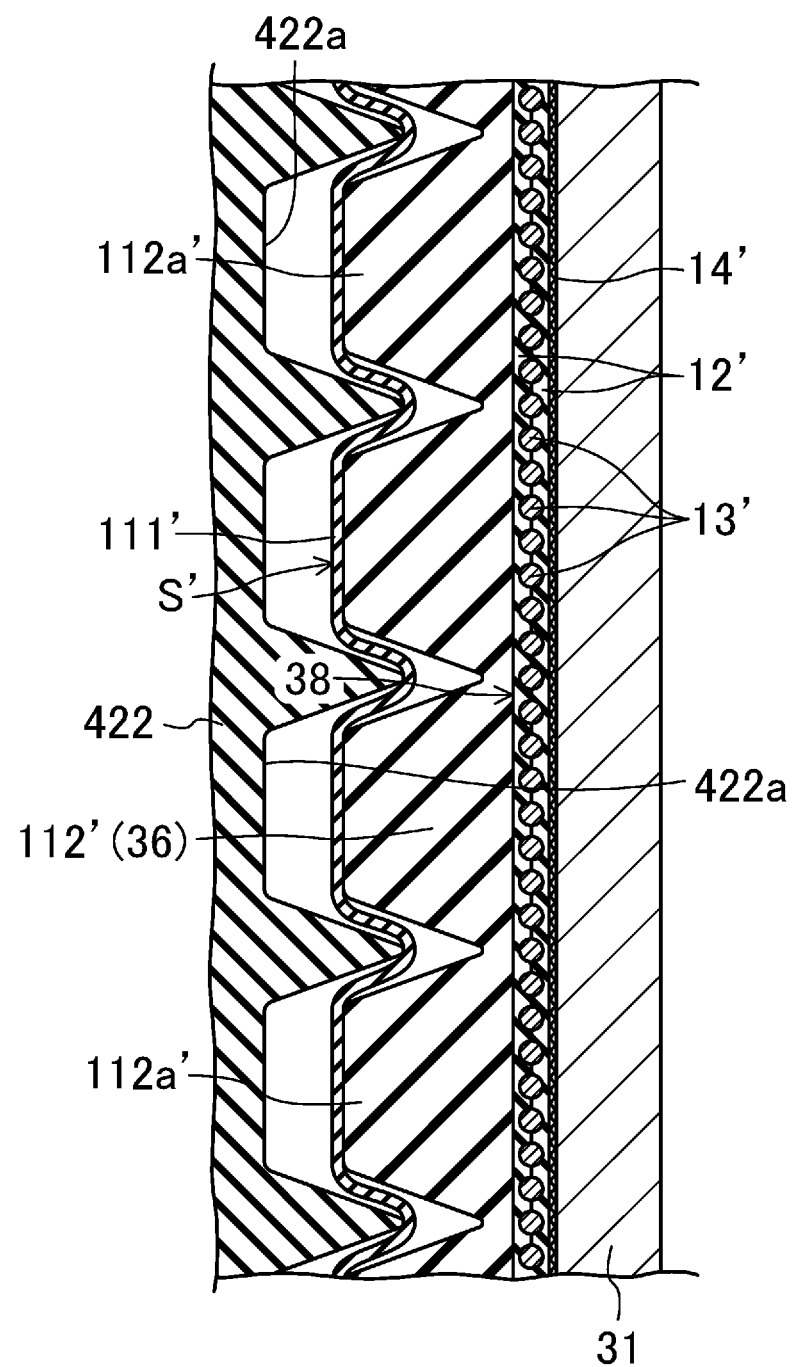
FIG. 18 is a diagram for showing a variation of a crosslinking step of the first to third production methods of the second embodiment.

In this case, as illustrated in FIG. 18, the core rubber sheet 112' pushes and stretches the surface rubber sheet 111' in the crosslinking step, and the core rubber sheet 112' and the surface rubber sheet 111' which covers the core rubber sheet 112' together form the compressed rubber sheet 11'. Further, each of the plurality of core rubber layer-forming portions 112a' of the core rubber sheet 112' enters an associated one of the compression layer-shape grooves 422a, while pushing and stretching the surface rubber sheet 111'. The core rubber layer-forming portion 112a' and the surface rubber sheet 111' thus covering the core rubber layer-forming portions 112a' together form the compression layer-forming portion 111a' in the associated one of the compression layer-shape grooves 422a.

Similarly, in wrapping the shaped structure 36 with the surface rubber sheet 111' in the shaping step of the fourth production method, the surface rubber sheet 111' may be wrapped to have a cylindrical shape, while being supported on the tops of the core rubber layer-forming portions 112a' of the core rubber sheet 112'.

Figure 19:
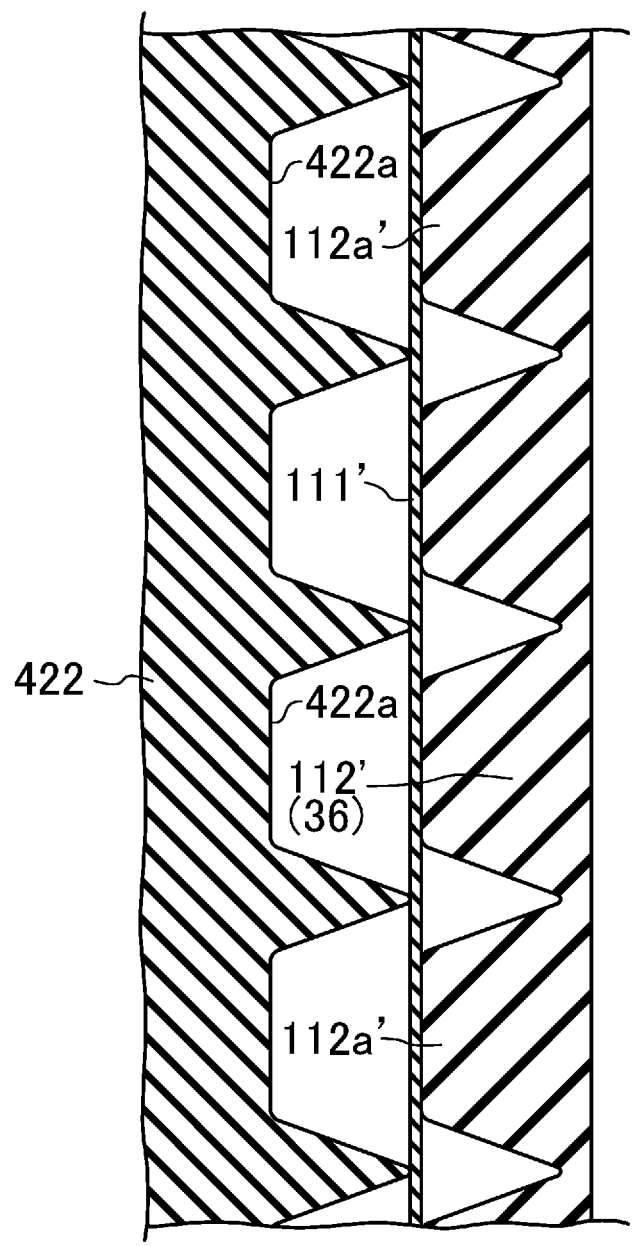
FIG. 19 is a diagram for showing a variation of a crosslinking step of the fourth production method of the second embodiment.

In this case, in the crosslinking step, as shown in FIG. 19, the shaped structure 36 covered with the surface rubber sheet 111' is set inside the expansion sleeve 422 such that the outer periphery of the surface rubber sheet 111' comes into contact with the expansion sleeve 422 at locations apart from each other in the circumferential direction, and that each of the plurality of core rubber layer-forming portions 112a' of the shaped structure 36 is located at the opening of an associated one of the compression layer-shape grooves 422a of the expansion sleeve 422.

Alternatively, in the shaping step of the first to fourth production methods, a surface rubber sheet 111' having a predetermined length may be formed into a cylindrical shape with its both ends joined together, and this surface rubber sheet 111' may be fitted over the core rubber sheet 112' or the shaped structure 36.

The other features and advantages are the same as those of the first embodiment.

Third Embodiment

Figure 20:
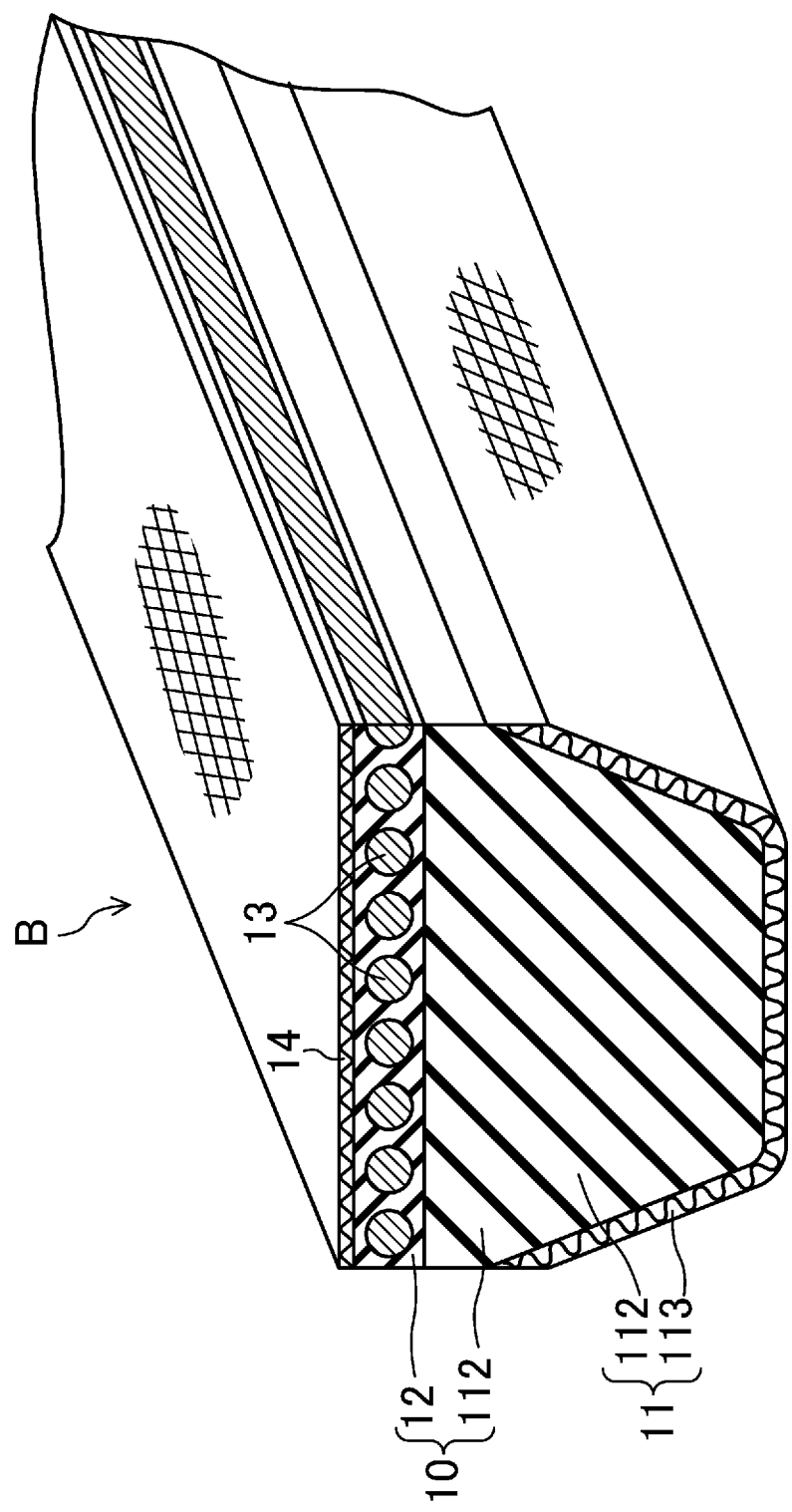
FIG. 20 illustrates a perspective view of a V-belt according to a third embodiment.

FIG. 20 illustrates a V-belt B of a third embodiment. Like reference characters have been used to designate the same elements as those in the first embodiment.

According to the third embodiment, the compression layer 11 of the V-belt B has a core rubber layer 112 constituting an inner portion of the compression layer 11 and a covering fabric 113 constituting a surface portion of the compression layer 11. The configurations of the core rubber layer 112 are the same as those of the V-belt B of the second embodiment.

The covering fabric 113 is comprised of a woven, knitted, or unwoven fabric made of nylon fibers, polyester fibers, aramid fibers, or cotton, for example. In a preferred embodiment, the covering fabric 113 is highly stretchable. An adhesion treatment may be provided to the covering fabric 113 to make the covering fabric 113 adhesive to the core rubber layer 112 of the belt body 10.

The other configurations are the same as those of the V-belt B of the first embodiment.

Production methods of the V-belt B according to the third embodiment will be described with reference to FIGS. 21A and 21B to FIG. 23.

The V-belt B of the third embodiment can be produced by a method similar to the first to fourth production methods of the first embodiment. In this embodiment, the compressed rubber sheet 11' is replaced with a core rubber sheet 112' for forming the core rubber layer 112 and a fabric material 113' (a sheet material) for forming the covering fabric 113. The core rubber sheet 112' formed into a cylindrical shape constitutes a shaped structure 36 having a cylindrical shape. The shaped structure 36 is made of an uncrosslinked rubber composition and has, on its outer peripheral surface, the core rubber layer-forming portions 112a' which are a plurality of ridges extending in the circumferential direction and arranged adjacent to one another in the axial direction.

According to the third embodiment, a cylindrical belt slab S comprised of V-belts B arranged adjacent to one another is formed. In each V-belt B, the friction transmission surfaces on both sides of the compression layer 11 are covered with the covering fabric 113. This belt slab S is cut into ring-shaped pieces such that one ring-shaped piece corresponds to one compression layer-forming portions 11', which means that a plurality of V-belts B can be produced out of one belt slab S unlike conventional wrapped V-belts. High production efficiency is achieved in this manner.

In the component preparation step of the first to fourth production methods, the core rubber sheet 112' for forming the core rubber layer 112 can be prepared by a method similar to the method for preparing the compressed rubber sheet 11' of the first production method shown in FIGS. 3A and 3B. A woven fabric or a fabric of any other type which is to serve as the fabric material 112' undergoes, as necessary, one kind or two or more kinds of the following treatments: an adhesion treatment in which the fabric is soaked in an epoxy resin solution or an isocyanate resin solution and heated; an adhesion treatment in which the fabric is soaked in an RFL aqueous solution and heated; an adhesion treatment in which the fabric is soaked in rubber cement and dried; and an adhesion treatment in which rubber cement is applied to a surface of the fabric which will face the core rubber layer 111 and dried.

Figure 21A:
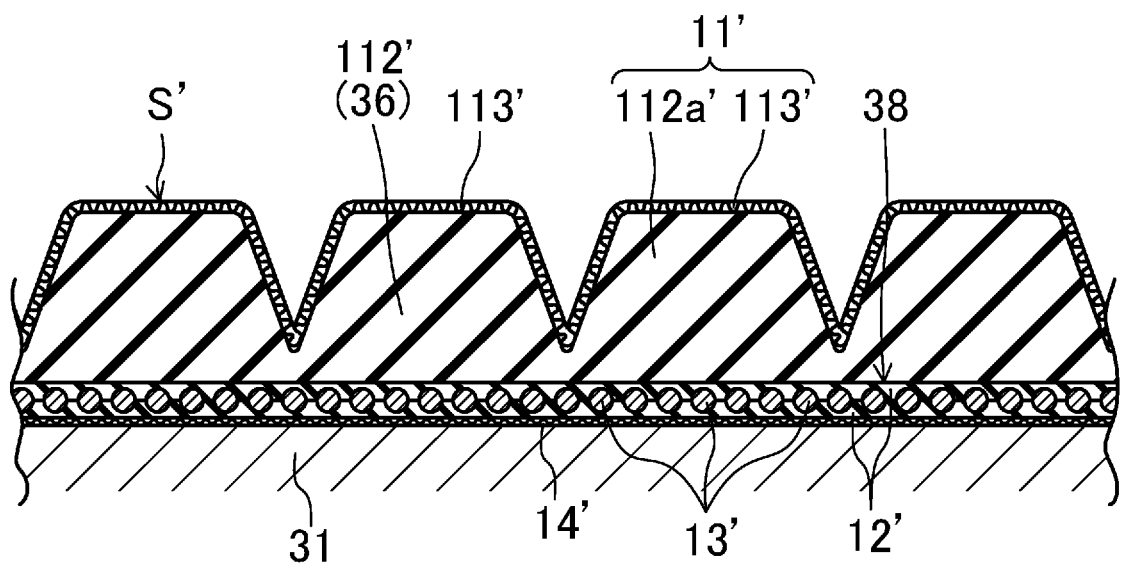
FIG. 21A is a first diagram for showing a shaping step of first to third production methods of the third embodiment.

In forming the uncrosslinked slab S' by wrapping the core rubber sheet 112' with the fabric material 113' in the shaping step of the first to third production methods, the compression layer-forming portion 11a' suitably consists of the core rubber sheet 112' (core rubber layer-forming portion 112a') and the fabric material 113' covering the core rubber sheet 112', as shown in FIG. 21A. That is, it is suitable to form the compression layer-forming portions 11a' by covering the core rubber layer-forming portions 112a', which are ridges, with the fabric material 113' prior to heating the shaped structure 36 and pressing the shaped structure 36 toward the mandrel 31. The core rubber sheet 112' wrapped around the tensile member 38 may be covered with the fabric material 113', or the core rubber sheet 112' covered with the fabric material 113' may be wrapped around the tensile member 38.

Figure 21B:
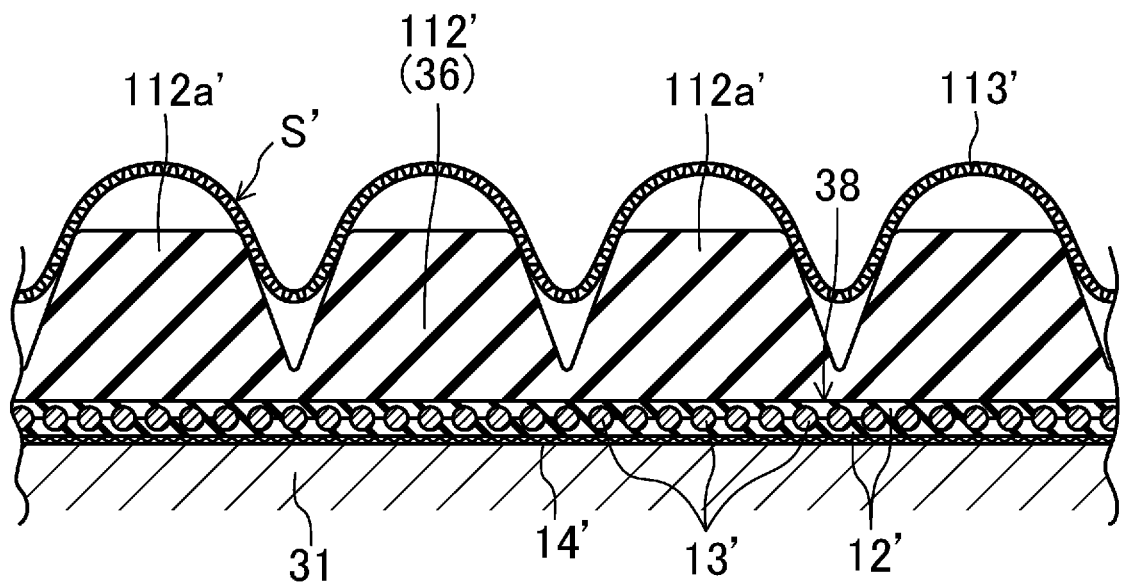
FIG. 21B is a second diagram for showing the shaping step of the first to third production methods of the third embodiment.

Covering the surface of the core rubber sheet 112' with the fabric material 113' in advance in this manner can substantially prevent the fabric material 113' from being stretched locally and significantly. This can substantially prevent seepage of rubber which may occur through a portion stretched locally and significantly, and consequently reduce an abnormal noise which may be generated during running of the belt. In order to reduce local stretch of the fabric material 113' to a small amount, it is also preferable that: the fabric material 113' is subjected to a pleating process so that the cross section in the width direction is corrugated to have the same pitches as those of the core rubber layer-forming portions 112a' as shown in FIG. 21B, prior to covering the surface of the core rubber sheet 112' with the fabric material 113'; the corrugated fabric material 113' is then set such that its portions protruding toward the core rubber sheet 112' (the core rubber layer-forming portions 112a') are positioned at grooves between the core rubber layer-forming portions 112a' of the core rubber sheet 112'; and the protruding portions are halfway fitted in the grooves so that the fabric material 113' loosely fits the core rubber sheet 112'. Such a pleating process may include continuously passing the fabric material 113' between a pair of plate-like or roll members for pleating the fabric material 113' which originally has a flat shape. Suitably, the fabric material 113' is subjected to a pleating process so that pitches of the pleated shape gradually decrease in a length direction. The fabric material 113' may be closely fitted to the core rubber sheet 112' (the core rubber layer-forming portions 112a') like a single sheet, or may simply lie along the surface of the core rubber sheet 112' instead of being closely fitted.

Similarly, in wrapping the shaped structure 36 with the fabric material 113' in the shaping step of the fourth production method, the compression layer-forming portions 11a' suitably consist of the core rubber sheet 112' (core rubber layer-forming portions 112a') and the fabric material 113' covering the core rubber sheet 112'.

Figure 22A:
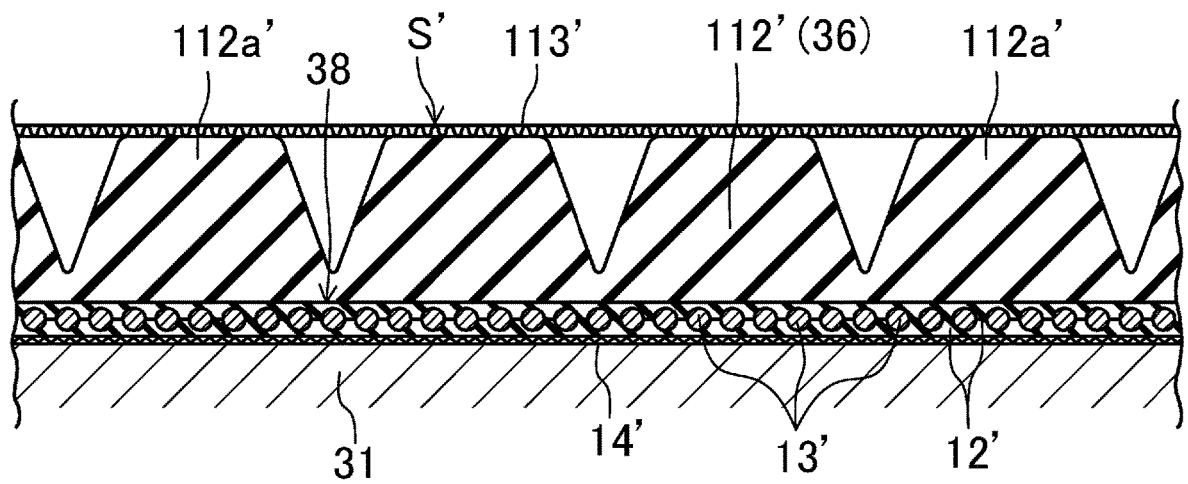
FIG. 22A is a diagram for showing a variation of the shaping step of the first to third production methods of the third embodiment.
Figure 22B:
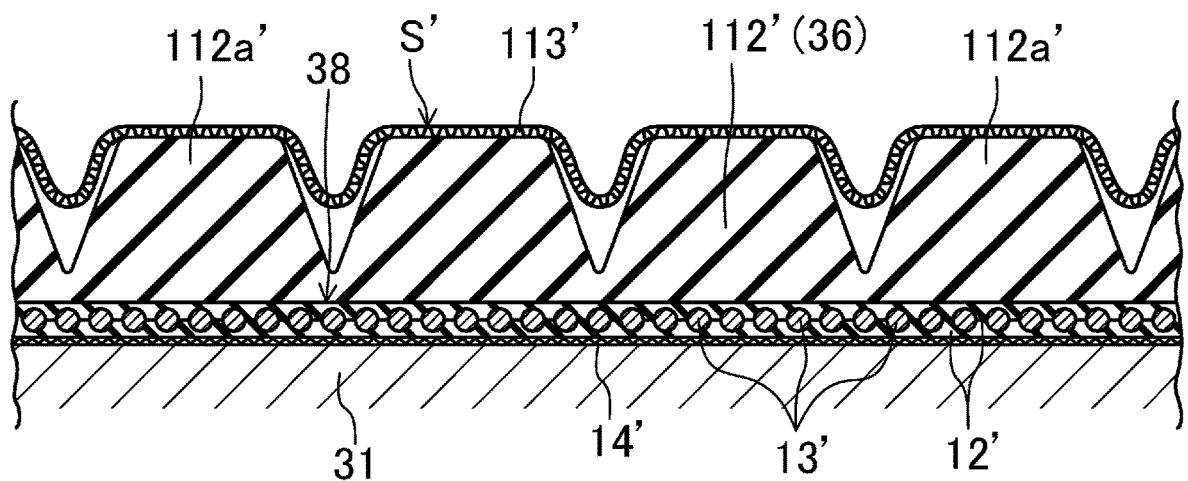
FIG. 22B is a diagram for showing another variation of the shaping step of the first to third production methods of the third embodiment.

In forming the uncrosslinked slab S' by wrapping the core rubber sheet 112' with the fabric material 113' in the shaping step of the first to third production methods, the fabric material 113' may be wrapped to have a cylindrical shape, while being supported on the tops of the core rubber layer-forming portions 112a' of the core rubber sheet 112', as illustrated in FIG. 22A. For the purpose of reducing local stretch of the fabric material 113' to a small amount, a portion of the fabric material 113' which corresponds to a groove between the core rubber layer-forming portions 112a' of the core rubber sheet 112' may be halfway fitted in the groove between the core rubber layer-forming portions 112a' of the core rubber sheet 112'. For the same purpose, similarly to the step shown in FIG. 21B, the fabric material 113' may be subjected to a pleating process so that the cross section in the width direction is corrugated to have the same pitches as the core rubber layer-forming portions 112a'. The fabric material 113' may be positioned such that a portion of the fabric material 113' which protrudes toward the core rubber sheet 112' is halfway fitted in a groove between the core rubber layer-forming portions 112a of the core rubber sheet 112', so that the fabric material 113' may loosely fit the core rubber sheet 112'. The core rubber sheet 112' wrapped around the tensile member 38 may be covered with the fabric material 113', or the core rubber sheet 112' around which the fabric material 113' has been wrapped may be wrapped around the tensile member 38.

Figure 23:
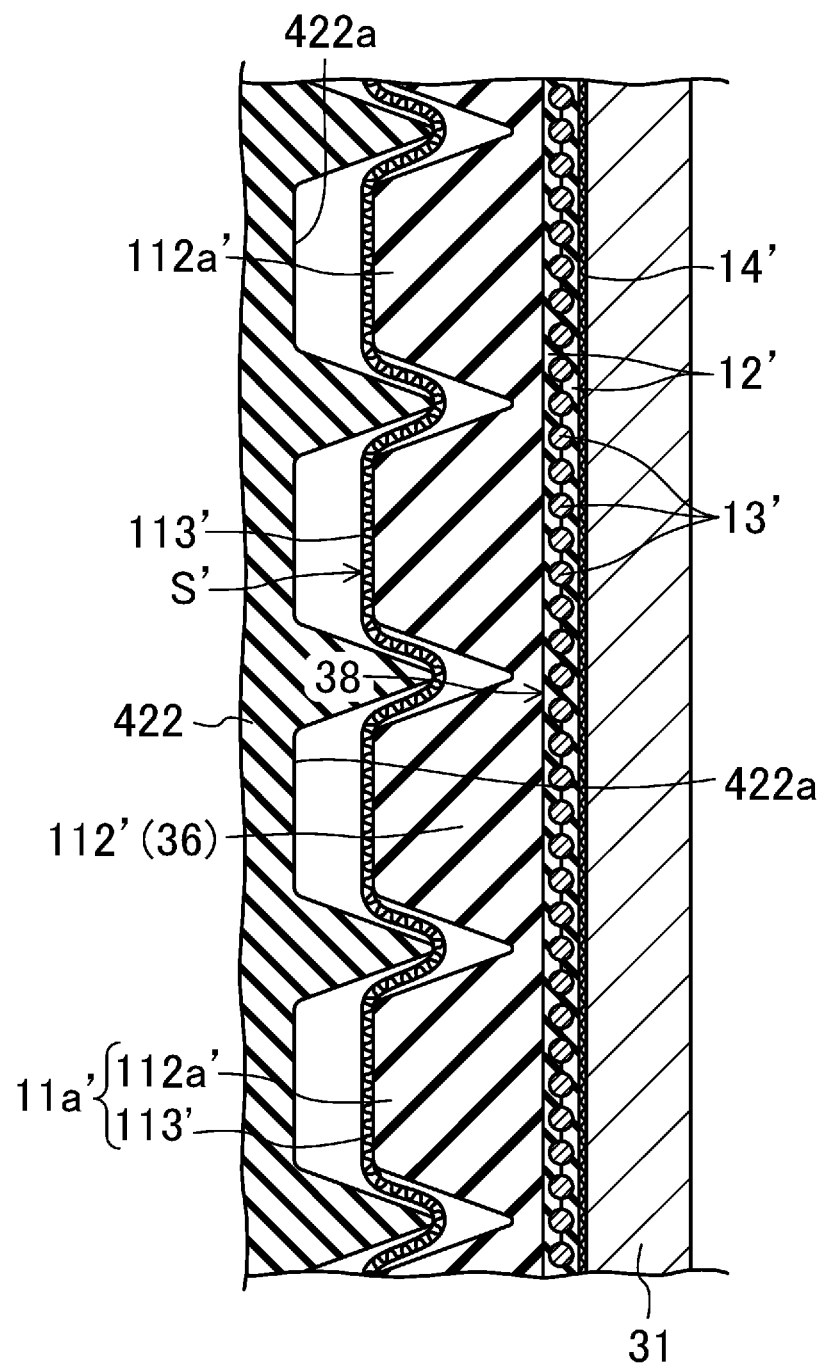
FIG. 23 is a diagram for showing a variation of a crosslinking step of the first to third production methods of the third embodiment.

In this case, in the crosslinking step, the core rubber sheet 112' pushes and stretches the fabric material 113', and is covered with the fabric material 113', as illustrated in FIG. 23. Further, each of the plurality of core rubber layer-forming portions 112a' of the core rubber sheet 112' enters an associated one of the compression layer-shape grooves 422a, while pushing and stretching the fabric material 113'. The core rubber layer-forming portion 112a' and the fabric material 113' thus covering the core rubber layer-forming portions 112a' together form the compression layer-forming portion 11a' in the associated one of the compression layer-shape grooves 422a.

Similarly, in wrapping the shaped structure 36 with the fabric material 113' in the shaping step of the fourth production method, the fabric material 113' may be wrapped to have a cylindrical shape, while being supported on the tops of the core rubber layer-forming portions 112a' of the core rubber sheet 112'.

Figure 24:
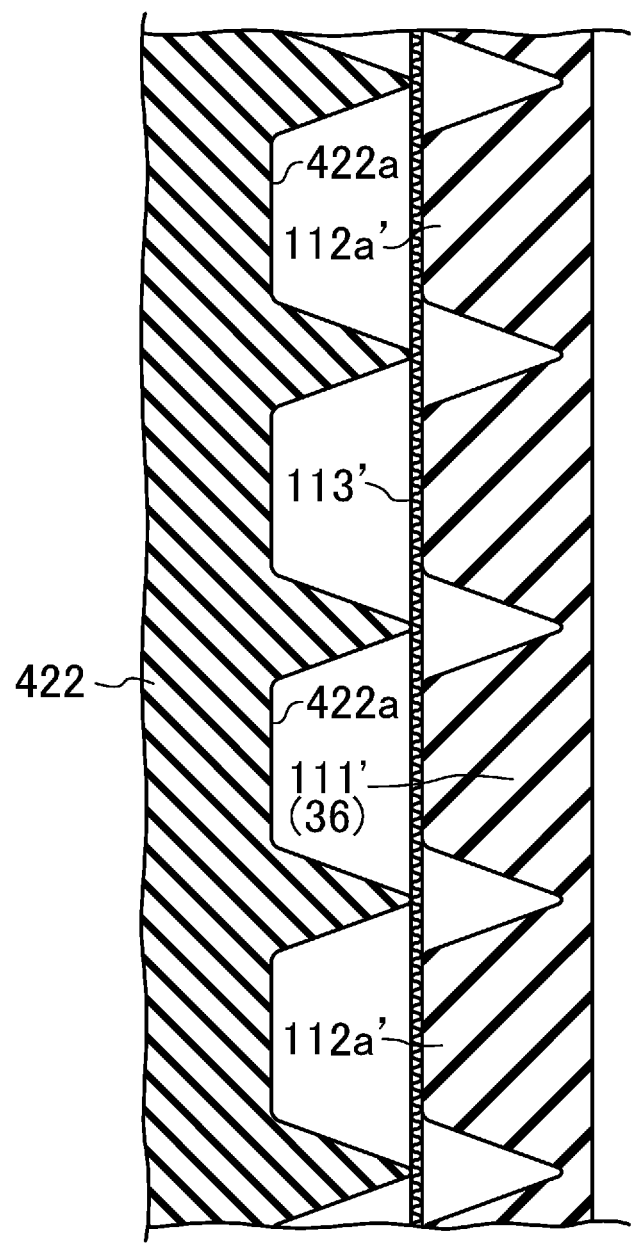
FIG. 24 is a diagram for showing a variation of a crosslinking step of a fourth production method of the third embodiment.

In this case, in the crosslinking step, as shown in FIG. 24, the shaped structure 36 covered with the fabric material 113' is set inside the expansion sleeve 422 such that the outer periphery of the fabric material 113' comes into contact with the expansion sleeve 422 at locations apart from each other in the circumferential direction, and that each of the plurality of core rubber layer-forming portions 112a' of the shaped structure 36 is located at the opening of an associated one of the compression layer-shape grooves 422a of the expansion sleeve 422.

Alternatively, in the shaping step of the first to fourth production methods, a fabric material 113' having a predetermined length may be formed into a cylindrical shape with its both ends joined together, and this fabric material 113' may be fitted over the core rubber sheet 112' or the shaped structure 36.

The other features and advantages are the same as those of the first embodiment.

Other Embodiments

Figure 25A:
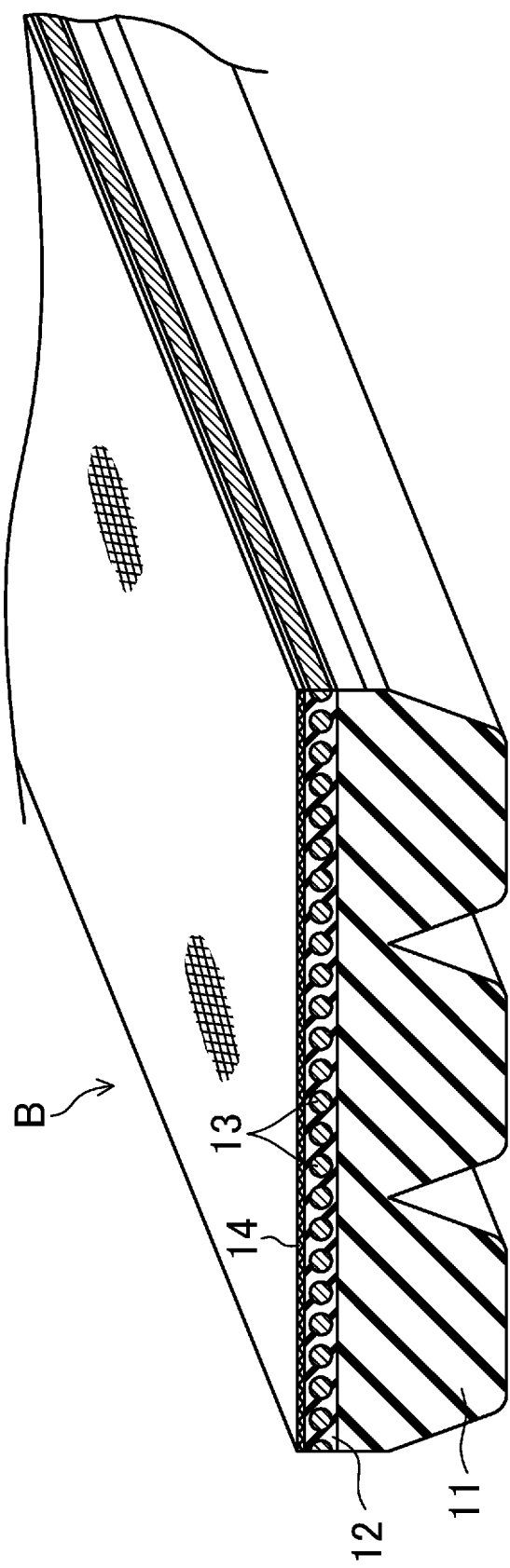
FIG. 25A illustrates a perspective view of a first V-ribbed belt according to another embodiment.
Figure 25B:
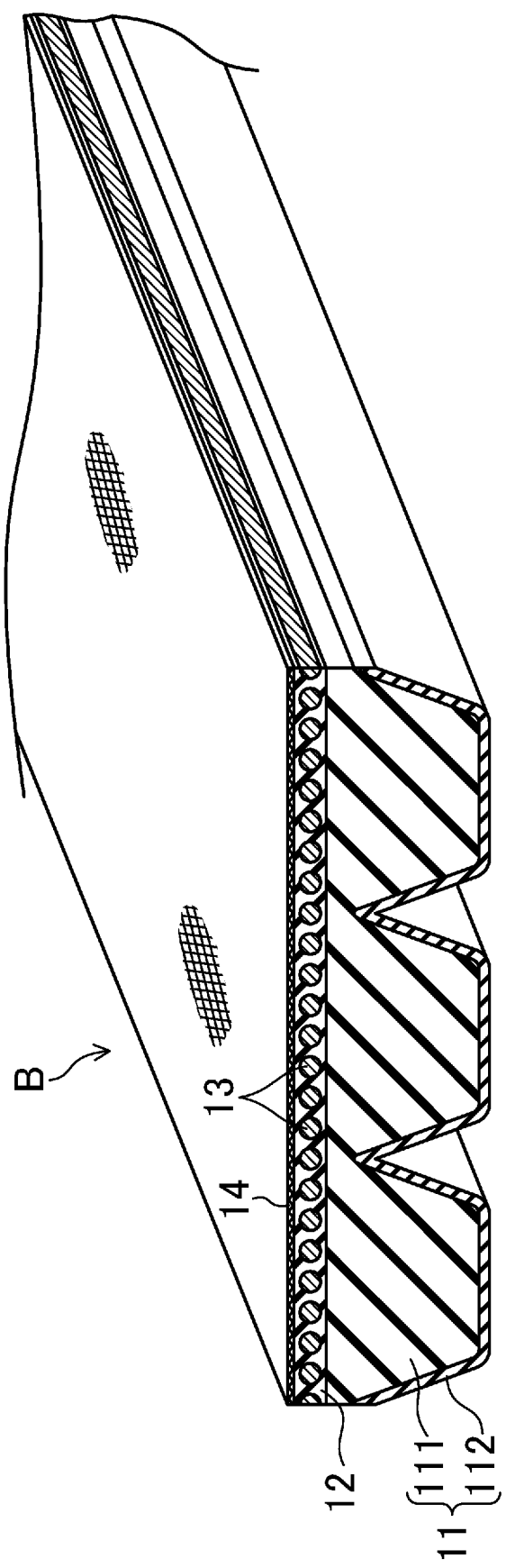
FIG. 25B illustrates a perspective view of a second V-ribbed belt according to another embodiment.

In the first to third embodiments, V-belts B have been described as non-limiting examples. The belt B may be a V-ribbed belt B in which the compression layer 11 is comprised of a single rubber layer as illustrated in FIG. 25A, or a V-ribbed belt B in which the compression layer 11 is comprised of a surface rubber layer 111 and a core rubber layer 112 as illustrated in FIG. 25B, or a V-ribbed belt B in which the compression layer 11 is comprised of a core rubber layer 112 and a covering fabric 113 as illustrated in FIG. 25C. Each of these V-ribbed belts B can be obtained by cutting a belt slab S, having a similar configuration as the configurations of the belt slabs S according to the first to third embodiments, into ring-shaped pieces such that one ring-shape piece corresponds to a plurality of compression layer-forming portions 11a' (three compression layer-forming portions 11a' in FIGS. 23A to 23C).

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A production method of a power transmission belt having a compression layer which forms an inner peripheral side, in a thickness direction, of the power transmission belt, the method comprising:

placing a shaped structure having a cylindrical shape at a first location radially inward of a belt mold having a cylindrical shape, an inner peripheral surface of the shaped structure being provided around at least a portion of a mandrel that is comprised of a rigid material, the shaped structure having, on an outer peripheral surface that is opposite the inner peripheral surface, a plurality of ridges extending in a circumferential direction and arranged adjacent to one another in an axial direction of the shaped structure, the belt mold being made of a flexible elastomer and having, on an inner peripheral surface, a plurality of compression layer-shape grooves extending in a circumferential direction and arranged adjacent to one another in an axial direction of the belt mold: and crosslinking the shaped structure while the shaped structure is placed radially inward of the belt mold, the crosslinking including:

applying a pressure to the belt mold at a second location radially outward of the belt mold, the flexibility of the belt mold and the application of the pressure at the second location being such that the belt mold presses the shaped structure in a radially inward direction toward the mandrel such that the shaped structure is pressed against and in contact with the mandrel in which each of a plurality of compression layer-forming portions, which are to be the compression layer and which are comprised of the plurality of ridges of the shaped structure, is fitted in an associated one of the compression layer-shape grooves of the belt mold, the mandrel being comprised of a rigid material such that the mandrel opposes the pressing of the belt mold in the radially inward direction, the applying of the pressure being such that a net compression force applied to the shaped structure throughout the crosslinking process is in the radially inward direction toward the mandrel; and heating the mandrel while the shaped structure is pressed against the mandrel such that the shaped structure is heated by the heated mandrel, the heating and the applying of the pressure being performed while each of the plurality of compression layer-forming portions is fitted in the associated one of the compression layer-shape grooves thereby molding a cylindrical belt slab.

2. The production method of claim 1, wherein
the compression layer is comprised of a single rubber layer, and the compression layer-forming portions are comprised of the plurality of ridges.

3. The production method of claim 1, wherein
the compression layer includes a surface material constituting a surface portion of the compression layer, and a core rubber layer constituting an inner portion of the compression layer, and
the compression layer-forming portions are comprised of the ridges and a sheet material covering the ridges, the sheet material serving as the surface material.

4. The production method of claim 3, wherein
the surface material is a surface rubber layer, and the sheet material is a surface rubber sheet made of an uncrosslinked rubber composition.

5. The production method of claim 4, wherein
prior to the heating the shaped structure and pressing the shaped structure toward the mandrel, the ridges are covered with the surface rubber sheet so as to form the compression layer-forming portions.

6. The production method of claim 3, wherein
the surface material is a covering fabric, and the sheet material is a fabric material.

7. The production method of claim 6, wherein
prior to the heating the shaped structure and pressing the shaped structure toward the mandrel, the ridges are covered with the fabric material so as to form the compression layer- forming portions.

8. The production method of claim 1, wherein
the belt mold does not have a joint portion on the inner peripheral surface.

9. The production method of claim 8, wherein
the pressing the shaped structure toward the mandrel is carried out by expanding the belt mold radially inward.

10. The production method of claim 8, wherein
in order to place the shaped structure radially inward of the belt mold, the mandrel provided with the shaped structure is placed radially inward of the belt mold which is being rotated on its axis and thus having an increased inner diameter, and thereafter the axial rotation of the belt mold is stopped to decrease the inner diameter.

11. The production method of claim 1, wherein
the belt mold is configured as a cylindrical object which is obtained by butting both ends of a sheet belt mold.

12. The production method of claim 1, wherein
prior to the heating the shaped structure and pressing the shaped structure toward the mandrel, the compression layer-forming portions are fitted in the compression layer-shape grooves.

* * * * *